(12) United States Patent
Nishino

(10) Patent No.: US 10,730,580 B2
(45) Date of Patent: Aug. 4, 2020

(54) BICYCLE CONTROL DEVICE

(71) Applicant: Shimano Inc., Sakai, Osaka (JP)

(72) Inventor: Takafumi Nishino, Osaka (JP)

(73) Assignee: Shimano Inc., Osaka (JP)

( * ) Notice: Subject to any disclaimer, the term of this patent is extended or adjusted under 35 U.S.C. 154(b) by 1710 days.

(21) Appl. No.: 14/159,750

(22) Filed: Jan. 21, 2014

(65) Prior Publication Data

US 2015/0203169 A1 Jul. 23, 2015

(51) Int. Cl.
| | |
|---|---|
| *B62M 25/08* | (2006.01) |
| *B62K 23/06* | (2006.01) |
| *B62M 25/04* | (2006.01) |
| *F16H 59/04* | (2006.01) |
| *B62L 3/02* | (2006.01) |
| *F16H 61/02* | (2006.01) |
| *F16H 59/02* | (2006.01) |

(52) U.S. Cl.
CPC .............. *B62K 23/06* (2013.01); *B62L 3/023* (2013.01); *B62M 25/04* (2013.01); *B62M 25/08* (2013.01); *F16H 59/04* (2013.01); *F16H 61/0213* (2013.01); *F16H 2059/0239* (2013.01); *Y10T 74/20396* (2015.01)

(58) Field of Classification Search
CPC ......... B62M 9/122; B62M 9/132; B62L 3/023
See application file for complete search history.

(56) References Cited

U.S. PATENT DOCUMENTS

| | | | |
|---|---|---|---|
| 5,241,878 A | 9/1993 | Nagano | |
| 5,257,683 A | 11/1993 | Romano | |
| 5,400,675 A | 3/1995 | Nagano | |
| 6,073,730 A | 6/2000 | Abe | |
| 6,216,078 B1 | 4/2001 | Jinbo et al. | |
| 7,124,873 B2 | 10/2006 | Tsumiyama | |
| 8,464,844 B2 * | 6/2013 | Jordan ..................... B60T 7/102 188/24.22 |
| 8,714,322 B2 * | 5/2014 | Dunlap ................... B62L 3/023 188/344 |
| 9,594,393 B2 * | 3/2017 | Kosaka .................. B62M 25/08 |
| 2002/0139637 A1 | 10/2002 | Tsumiyama et al. | |

(Continued)

FOREIGN PATENT DOCUMENTS

| | | |
|---|---|---|
| CN | 101786483 B | 8/2012 |
| JP | 3182206 U | 2/2013 |

*Primary Examiner* — Randell J Krug

(74) *Attorney, Agent, or Firm* — Global IP Counselors, LLP

(57) ABSTRACT

A bicycle control device is basically provided with a base member, a first operating member, an electric unit and a hydraulic unit. The base member is configured to be fixed to a bicycle part. The first operating member is coupled to the base member. The first operating member is configured to move along a first path from a rest position to a first position as a first movement. The first operating member is configured to move along the first path from the rest position to a second position via the first position as a second movement. The electric unit is configured to output a first signal causing a first operation of an electric device in response to the first movement. The electric unit is configured to output a second signal causing a second operation of the electric device in response to the second movement. The hydraulic unit is coupled to the base member to operate a hydraulic device.

15 Claims, 21 Drawing Sheets

(56) References Cited

U.S. PATENT DOCUMENTS

| | | |
|---|---|---|
| 2007/0068314 A1 | 3/2007 | Miki |
| 2008/0196537 A1 | 8/2008 | Dal Pra' |
| 2010/0083788 A1 | 4/2010 | Jordan et al. |
| 2010/0186538 A1* | 7/2010 | Tetsuka .................. B60T 7/102 74/501.6 |
| 2013/0031998 A1* | 2/2013 | Miki ..................... B62M 25/04 74/473.12 |

* cited by examiner

BICYCLE CONTROL DEVICE

BACKGROUND

Field of the Invention

This invention generally relates to a bicycle control device. More specifically, the present invention relates to a bicycle control device for electrically controlling a first bicycle component and for hydraulically controlling a second bicycle component.

Background Information

In the past, most bicycles used cables to operate the various bicycle components to perform such functions as shifting gears and braking. Examples of a bicycle control device that combines both shifting and braking functions into a single unit are disclosed in the following patents: U.S. Pat. No. 4,241,878; U.S. Pat. No. 5,257,683; and U.S. Pat. No. 5,400,675. In recent years, some bicycles have been provided with electric and/or hydraulic bicycle components. For example, some bicycles include an electric gear changing device (e.g., an electric derailleur or electric internally geared hub) for changing speeds (See, for example U.S. Pat. No. 6,216,078. Also for example, some bicycles include hydraulic brake systems for stopping or slowing down the bicycle (See, for example U.S. Pat. No. 8,464,844). The bicycle control devices for these electric bicycle components are often provided on the handlebar. When the bicycle control device is installed on the handlebar, the bicycle control device will have a different configuration depending on the type of handlebar.

SUMMARY

Generally, the present disclosure is directed to various features of a bicycle control device. In one feature, a bicycle control device is configured to electrically control a first bicycle component and hydraulically control a second bicycle component.

In view of the state of the known technology and in accordance with a first aspect of the present disclosure, a bicycle control device is provided that basically comprises a base member, a first operating member, an electric unit and a hydraulic unit. The base member is configured to be fixed to a bicycle part. The first operating member is coupled to the base member. The first operating member is configured to move along a first path from a rest position to a first position as a first movement. The first operating member is configured to move along the first path from the rest position to a second position via the first position as a second movement. The electric unit is configured to output a first signal causing a first operation of an electric device in response to the first movement. The electric unit is configured to output a second signal causing a second operation of the electric device in response to the second movement. The hydraulic unit is coupled to the base member to operate a hydraulic device.

In accordance with a second aspect of the present invention, the bicycle control device according to the first aspect further comprises a second operating member coupled to the base member. The second operating member is configured to move along a second path differing from the first path so as to actuate the hydraulic unit in response to a movement along the second path.

In accordance with a third aspect of the present invention, the bicycle control device according to the second aspect is configured so that the first operating member is configured to be pivotally moved relative to the base member about a first axis along the first path, and to be pivotally moved relative to the base member about a second axis to move along the second path.

In accordance with a fourth aspect of the present invention, the bicycle control device according to the third aspect is configured so that the second operating member is configured to be pivotally moved relative to the base member about a third axis along the second path, and the first operating member is configured to be moved along the second path in response to a pivotal movement of the second operating member along the second path.

In accordance with a fifth aspect of the present invention, the bicycle control device according to the second aspect is configured so that the hydraulic unit includes a cylinder, and a piston coupled to the second operating member and movably arranged at the cylinder so as to form a fluid chamber in the cylinder. The hydraulic unit is configured such that the piston is pushed to reduce a volume of the fluid chamber.

In accordance with a sixth aspect of the present invention, the bicycle control device according to the fifth aspect is configured so that the second operating member is configured to be pivotally moved relative to the base member about a third axis along the second path, and the cylinder is provided on the base member, and arranged directly above the third axis in a state where the bicycle control device is fixed to the bicycle part.

In accordance with a seventh aspect of the present invention, the bicycle control device according to the sixth aspect is configured so that the hydraulic unit further includes a fluid reservoir being in fluid communication with the cylinder. The fluid reservoir is arranged directly above the third axis in a state where the bicycle control device is fixed to the bicycle part.

In accordance with an eighth aspect of the present invention, the bicycle control device according to the first aspect is configured so that the electric unit includes a first electric switch configured to output the first signal in response to the first movement of the first operating member, and a second electric switch configured to output the second signal in response to the second movement of the first operating member.

In accordance with a ninth aspect of the present invention, the bicycle control device according to the eighth aspect further comprises a controller electrically coupled to the first and second electric switches. The controller outputting a first command to cause the first operation in response to receiving the first signal upon a state in which the second signal is absent within a predetermined period after receiving the first signal. The controller outputting a second command to cause the second operation in response to receiving the second signal.

In accordance with a tenth aspect of the present invention, the bicycle control device according to the ninth aspect is configured so that the electric device comprises an electric transmission device, and the first command is an upshift command and the second command is a downshift command.

In accordance with an eleventh aspect of the present invention, the bicycle control device according to the ninth aspect is configured so that the controller is configured not to output the first and second commands as the first operating member moves toward the rest position.

In accordance with a twelfth aspect of the present invention, the bicycle control device according to the ninth aspect is configured so that the first operating member is configured to move along the first path from the rest position to a third position via the first and second positions as a third movement. The electric unit further includes a third electric switch configured to output a third signal in response to the third movement of the first operating member. The controller is electrically coupled to the third electric switch. The controller outputs a third command in response to receiving the third signal.

In accordance with a thirteenth aspect of the present invention, the bicycle control device according to the twelfth aspect is configured so that the controller is configured not to output the first, second and third commands as the first operating member moves toward the rest position.

In accordance with a fourteenth aspect of the present invention, the bicycle control device according to the twelfth aspect is configured so that the electric device comprises an electric transmission device, and the first command is an upshift command and the second and third commands are downshift commands.

In accordance with a fifteenth aspect of the present invention, the bicycle control device according to the twelfth aspect is configured so that the electric device comprises an electric transmission device, and the controller is coupled to an additional electric transmission device. The first command is one of an upshift command and a downshift command of the electric transmission device. The second command is the other of the upshift command and the downshift command. The third command is a synchro-mode control command between the electric transmission device and the additional electric transmission device.

Also other objects, features, aspects and advantages of the disclosed bicycle control device will become apparent to those skilled in the art from the following detailed description, which, taken in conjunction with the annexed drawings, discloses one embodiment of the bicycle control device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
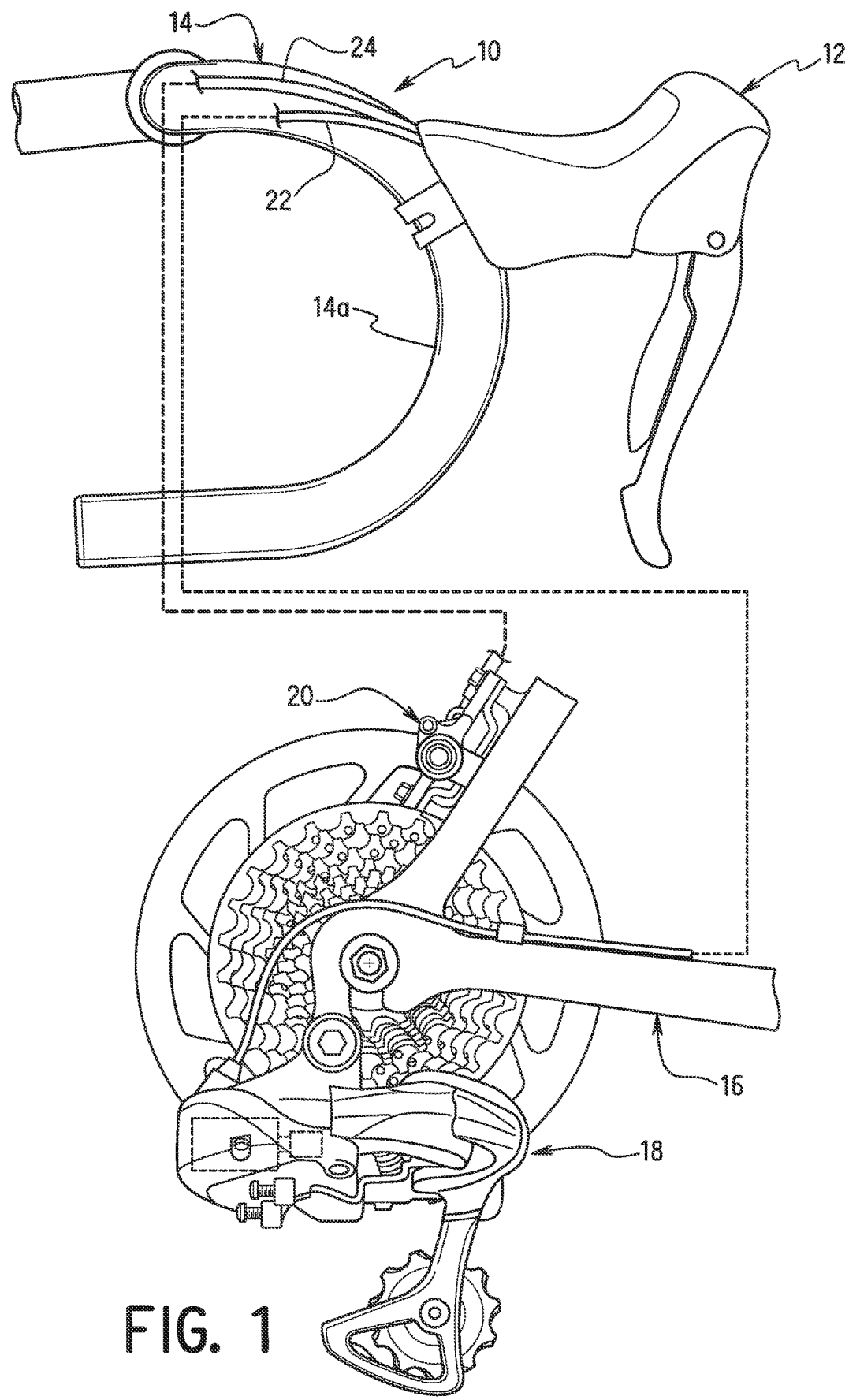
FIG. 1 is a side elevational view of a right bicycle control device according to a first embodiment, with the bicycle control device mounted on a handlebar of a bicycle and operatively coupled to an electric rear derailleur and a hydraulic rear disc brake caliper.

Referring initially to FIG. 1, a bicycle 10 is partially illustrated in which a bicycle control device 12 is attached to a drop handlebar 14 in accordance with a first embodiment. In the first embodiment, the bicycle 10 is as a racing style road bicycle, and the bicycle control device 12 is a bicycle brake/shift device, which is also known as a bicycle brifter. A bicycle brifter is a device that includes both a braking function and a shifting function in a single unit that is mounted to the bicycle. A bicycle dropdown brifter is a device that is specifically configured to be mounted to the curved section 14a of the drop handlebar 14, as illustrated in FIG. 1, and that includes both braking and shifting functions in a single unit.

The bicycle 10 has a conventional frame 16 that includes, among other things, an electric rear derailleur 18 (i.e., a first bicycle component) and a hydraulic rear disc brake caliper 20 (i.e., a second bicycle component). The electric rear derailleur 18 is an example of an electric device, and the hydraulic rear disc brake caliper 20 is an example of a hydraulic brake device. The bicycle control device 12 is electrically connected to the electric rear derailleur 18 by an electric wire 22. The bicycle control device 12 is hydraulically connected to the hydraulic rear disc brake caliper 20 by a hydraulic hose 24.

The bicycle control device 12 is a right hand side control device operated by the rider's right hand to selectively operate the electric rear derailleur 18 and the hydraulic rear disc brake caliper 20. It will be apparent to those skilled in the art that the configuration of the bicycle control device 12 can be constructed to a left hand side control device that is operated by the rider's left hand. Also, the bicycle control device 12 can be constructed to operate an electric front derailleur or other electric gear changing devices, and a hydraulic front disc brake caliper or other hydraulic brake device. The bicycle control device 12 is not constructed or configured to operate a bicycle component by pulling and/or releasing a control cable or the like. Rather, the bicycle control device 12 outputs electrical signals or commands for controlling electric devices having an electric actuator. However, the bicycle control device 12 is constructed or configured to be operated in a manner similar to a bicycle control device that selectively pulls and releases a control cable to operate a bicycle component.

Figure 2:
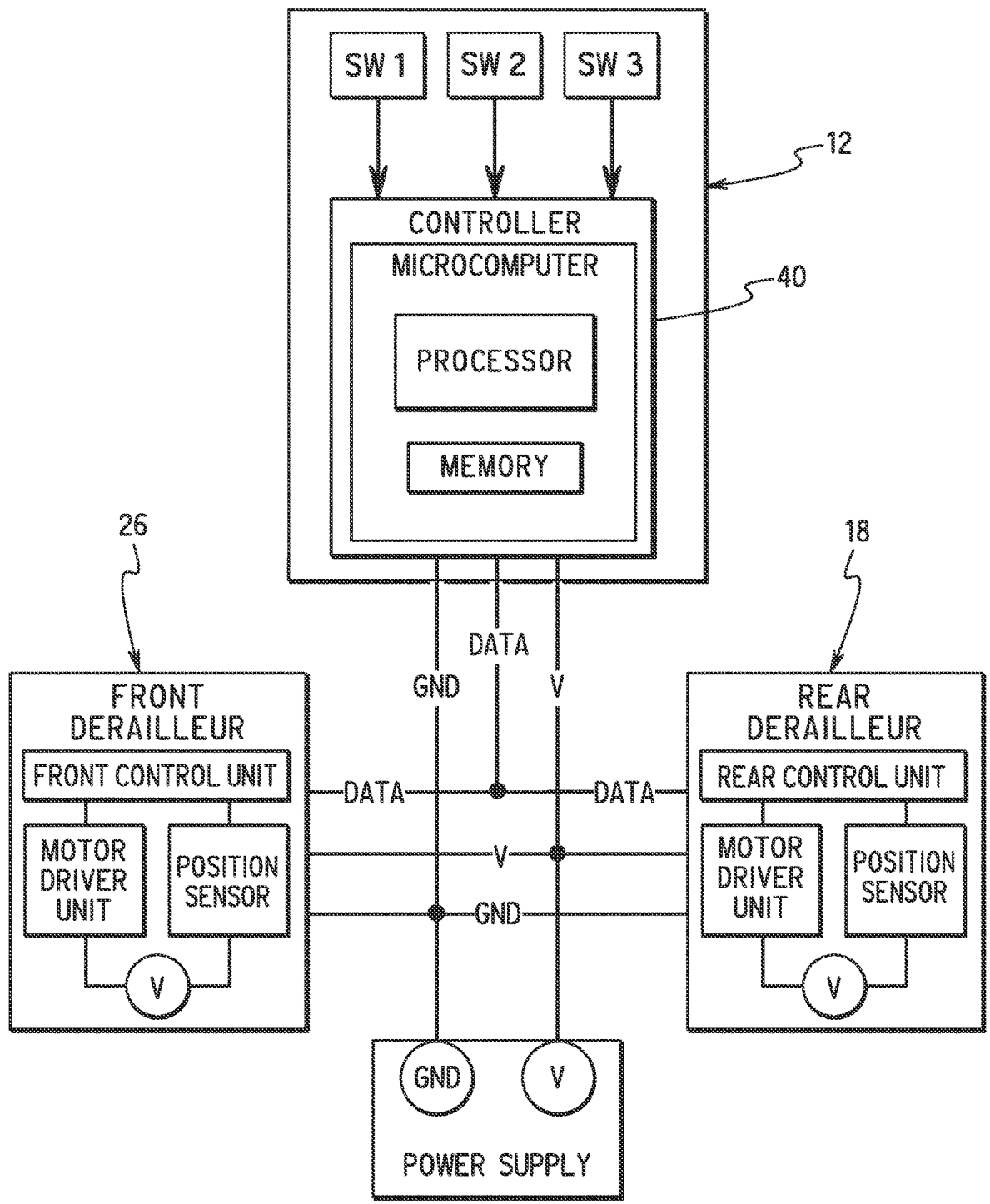
FIG. 2 is a simplified schematic block diagram showing an exemplary configuration of an electric shifting arrangement that includes the bicycle control device illustrated in FIG. 1, and wherein the bicycle control device is also electrically connected to a front derailleur to perform synchro-mode control of both the front and rear derailleurs.

Referring to FIG. 2, a simplified schematic block diagram is illustrated to show an exemplary configuration of an electric shifting arrangement that includes the bicycle control device 12 illustrated in FIG. 1. As seen in FIG. 2, the bicycle control device 12 is configured to also operate an electric front derailleur 26. Thus, as explained below, when the bicycle control device 12 is operatively coupled to both the electric rear derailleur 18 and the electric front derailleur 26, the rider can operate the bicycle control device 12 to either only operate one of the electric derailleurs 18 and 26 to perform upshifting and downshifting operations, or substantially simultaneously perform a synchro-mode control of both of the electric derailleurs 18 and 26. The electric rear derailleur 18 constitutes an electric device that comprises an electric transmission device and the electric front derailleur 26 constitutes an additional electric device that comprises an electric transmission device. While the bicycle control device 12 is illustrated as being electrically connected to the electric derailleurs 18 and 26 by wires, it will be apparent to those skilled in the bicycle field from this disclosure that the bicycle control device 12 can be configured to wirelessly communicate with the electric derailleurs 18 and 26 using conventional wireless communication technology for transmitting data. Also, while the bicycle control device 12 is illustrated as communicating with the electric derailleurs 18 and 26 by data lines, it will be apparent to those skilled in the bicycle field from this disclosure that the bicycle control device 12 can be configured to communicate with the electric derailleurs 18 and 26 using power line communication (PLC) technology for transmitting data. The communication between the bicycle control device 12 and the electric derailleurs 18 and 26 is preferably two-way communication.

Figure 3:
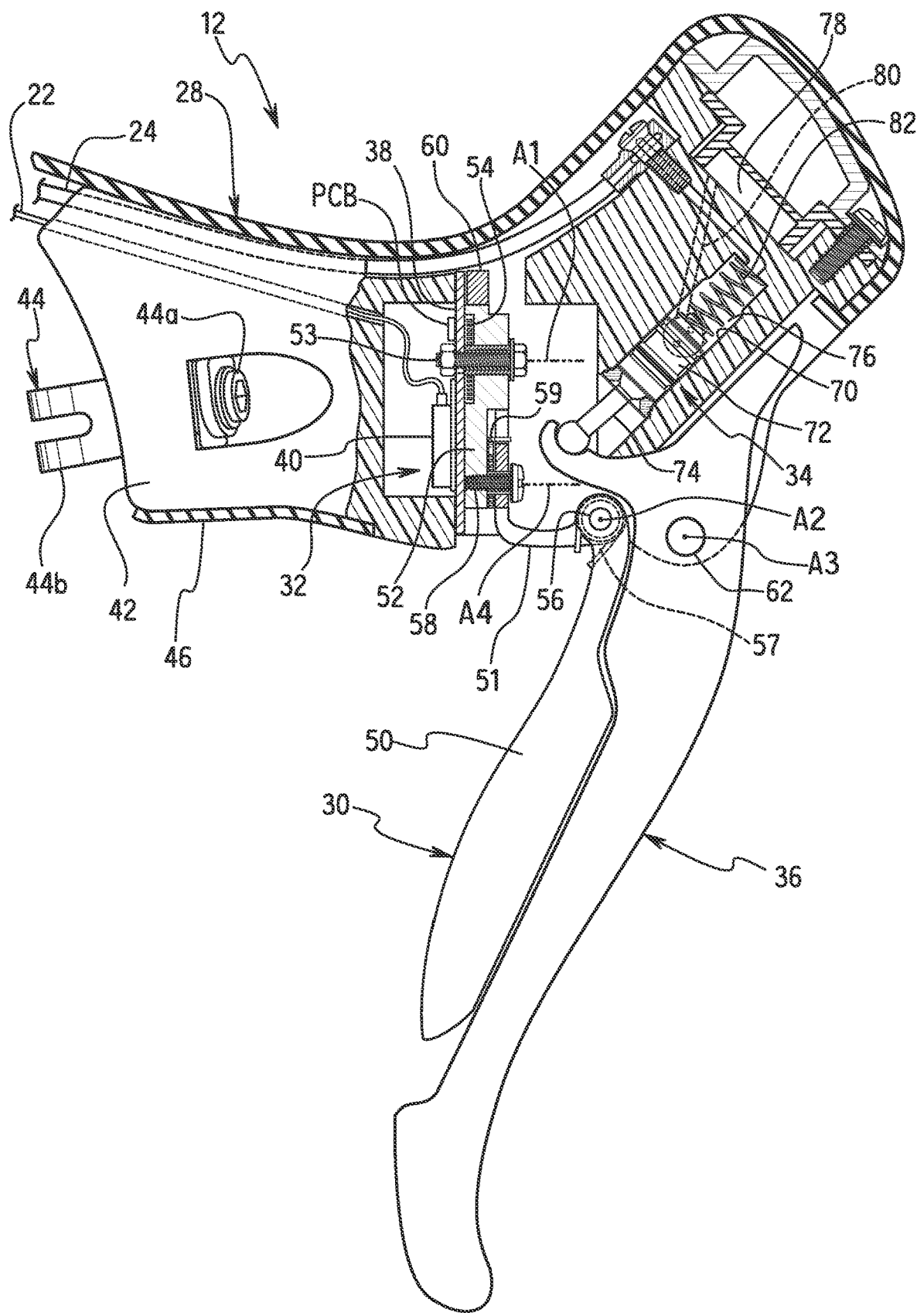
FIG. 3 is a cross sectional view of the bicycle control device illustrated in FIG. 1 with the first and second operating members in rest positions or non-operated positions.
Figure 4:
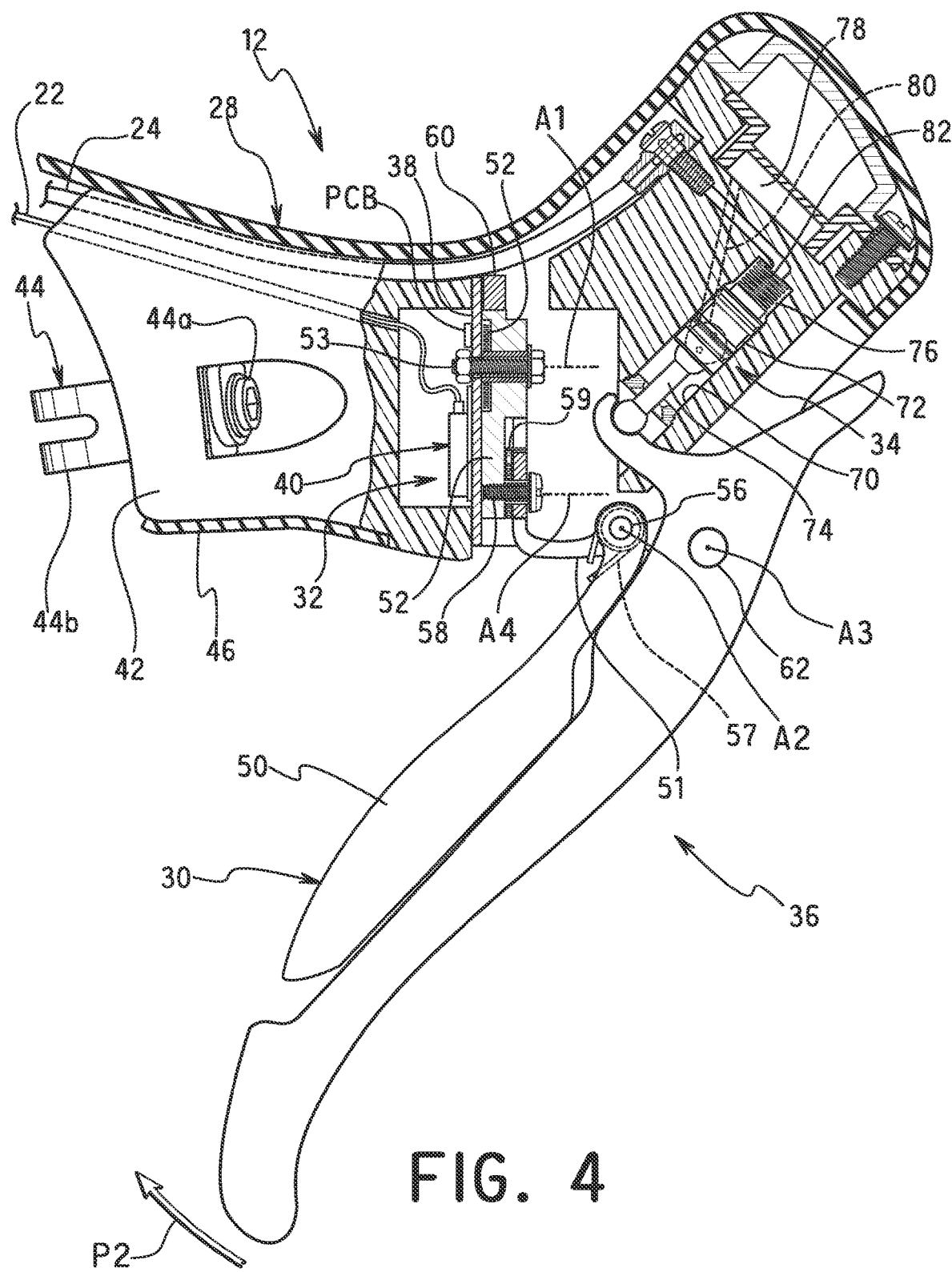
FIG. 4 is a cross sectional view, similar to FIG. 3, of the bicycle control device illustrated in FIGS. 1 and 3 with the second operating member moved from the rest position to a braking position or operated position and the first operating member being moved by the second operating member moved from the rest position to non-actuating position.

As illustrated in FIGS. 2 to 4, the bicycle control device 12 basically includes a base member 28, a first operating member or lever 30, an electric unit 32 and a hydraulic unit 34. In the first embodiment, the bicycle control device 12 further comprises a second operating member 36 that is coupled to the base member 28. A support plate 38 is provided for mounting the first operating member 30 to the base member 28. Also in the first embodiment, the bicycle control device 12 further comprises a controller 40 that is provided on the support plate 38 inside an interior space of the base member 28. In the first embodiment, the electric unit 32 is an electric shifting unit, and the hydraulic unit 34 is a hydraulic braking unit. Generally, the first operating member 30 is operatively arranged to actuate the electric unit 32, while the second operating member 36 is operatively arranged to actuate the hydraulic unit 34.

Figure 5:
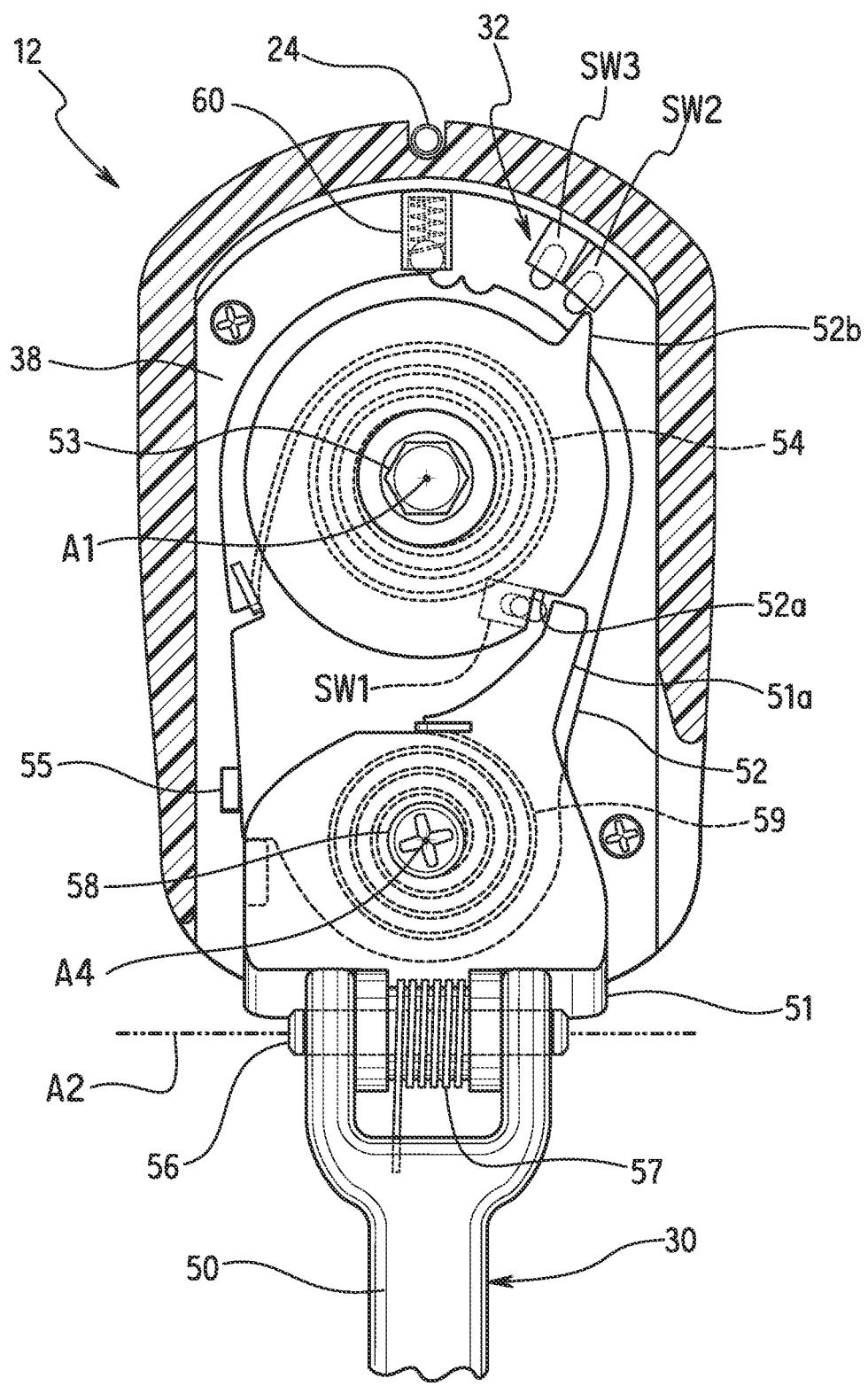
FIG. 5 is an enlarged cross sectional view of the bicycle control device illustrated in FIGS. 1, 3 and 4 with the first operating member in the rest position or non-operated position.

The electric unit 32 includes a first electric switch SW1 and a second electric switch SW2 (FIGS. 2 and 5). The first and second electric switches SW1 and SW2 are examples of movement detectors that detect the movement of the first operating member 30. The controller 40 is electrically coupled to the first and second electric switches SW1 and SW2. In the first embodiment, the first and second electric switches SW1 and SW2 are electrically coupled to the controller 40 by a printed circuit board PCB that is provided on the rear side of the support plate 38. In this way, the controller 40 is provided in the base member 28 fixed mounted to the base member 28. Preferably, the controller 40 or the printed circuit board PCB is provided with a connector port for connecting a personal computer or a cycle computer. In this way, the software of the controller 40 can be update, and user settable parameters can be adjusted as needed and/or desired.

The first electric switch SW1 is mounted on a part of the first operating member 30 and the second electric switch SW2 is mounted on the support plate 38 as discussed below. Actuation of the first electric switch SW1 causes a first detection signal to be outputted to the controller 40. The first detection signal will simply be called the "first signal" hereinafter. Actuation of the second electric switch SW2 causes a second detection signal to be outputted to the controller 40. The second detection signal will simply be called the "second signal" hereinafter. In the first embodiment, the first and second electric switches SW1 and SW2 are press type contact switches that are depressed in order to actuate the switches and to produce a signal. Alternatively, the first and second electric switches SW1 and SW2 can be contactless switches if needed and/or desired.

In the first embodiment, the first operating member 30 is only used for electric operation (e.g., for operating one or both of the electric derailleurs 18 and 26), while the second operating member 36 is only used for hydraulic operation (e.g., for operating the hydraulic rear disc brake caliper 20). In the first embodiment, the first operating member 30 is configured to be pivotally moved relative to the base member 28 about a first axis A1 along a first path P1 as seen in FIGS. 5 to 8. In addition, the first operating member 30 is configured to be pivotally moved relative to the base member 28 about a second axis A2 to move along a second path P2 as seen in FIG. 4. In the first embodiment, the first axis A1 and the second axis A2 are perpendicularly arranged as viewed from above. The second operating member 36 is configured to move along the second path P2 differing from the first path P1 so as to actuate the hydraulic unit 34 in response to a movement along the second path P2. In the first embodiment, the second operating member 36 is configured to be pivotally moved relative to the base member 28 about a third axis A3 along the second path P2. In the first embodiment, the second axis A2 and the third axis A3 are parallel. The first operating member 30 is configured to be moved along the second path P2 in response to a pivotal movement of the second operating member 36 along the second path P2. Further, the first operating member 30 is configured to independently move along the second path P2 with respect to the second operating member 36.

The first operating member 30 is coupled to the base member 28. The first operating member 30 is configured to move along the first path P1 from a rest position (FIGS. 3 and 5) to a first position (FIG. 6) as a first movement. The electric unit 32 is configured to output the first signal causing a first operation of an electric device (e.g., the electric rear derailleur 18) in response to the first movement. In particular, the first electric switch SW1 is configured to output the first signal in response to the first movement of the first operating member 30. As seen in FIG. 2, the controller 40 is electrically coupled to the first electric switch SW1. The controller 40 is configured or programmed to output a first command in response to receiving the first signal, as explained below.

Furthermore, the first operating member 30 is configured to move along the first path P1 from the rest position (FIGS. 3 and 5) to a second position (FIG. 7) via the first position (FIG. 6) as a second movement. The electric unit 32 is configured to output a second signal causing a second operation of the electric device (e.g., the electric rear derailleur 18) in response to the second movement. In particular, the second electric switch SW2 is configured to output the second signal in response to the second movement of the first operating member 30. As seen in FIG. 2, the controller 40 is electrically coupled to the second electric switch SW2. The controller 40 is configured or programmed to output a second command in response to receiving the second signal, as explained below.

In the first embodiment, the electric unit 32 further includes a third electric switch SW3. In the first embodiment, the third electric switch SW3 is electrically coupled to the controller 40 by the printed circuit board PCB that is fixedly mounted to the support plate 38. Actuation of the third electric switch SW3 causes a third detection signal to be outputted to the controller 40. The third detection signal will simply be called the "third signal" hereinafter. In the first embodiment, the third electric switch SW3 is a press type contact switch that is depressed in order to actuate the switch and to produce a signal. Alternatively, the third electric switch SW3 can be contactless switch if needed and/or desired. When the third electric switch SW3 is provided, the first operating member 30 is configured to move along the first path P1 from the rest position (FIGS. 3 and 5) to a third position (FIG. 8) via the first and second positions (FIGS. 6 and 7) as a third movement. The third electric switch SW3 is configured to output the third signal in response to the third movement of the first operating member 30. The controller 40 is electrically coupled to the third electric switch SW3. The controller 40 is configured or programmed to output a third command in response to receiving the third signal, as explained below.

Here, in the first embodiment, the base member 28 includes a gripping bracket 42 and a handlebar mounting clamp 44. A grip cover 46 is stretched over at least a rider's gripping portion of the gripping bracket 42 to provide a cushion to the gripping portion of the gripping bracket 42 and to provide an attractive appearance. The gripping bracket 42 is configured to be gripped by a rider. The gripping bracket 42 is typically made of a rigid, hard material such as a hard plastic or metal. For example, the gripping bracket 42 is made of a synthetic resin such as a polyamide resin or a metal such as aluminum. Typically, the grip cover 46 is made of elastic material, such as rubber, and covers the outside surface of the gripping bracket 42. Thus, the base member 28 is configured to be fixed to a bicycle part (e.g., drop handlebar 14). The handlebar mounting clamp 44 is a conventional band-clamp that can be fixed to the drop handlebar 14 by turning a fastening bolt 44a to tighten a band 44b.

As seen in FIGS. 3 and 4, in the first embodiment, the first operating member 30 is attached to the gripping bracket 42 by the support plate 38 that supports the first, second and third electric switches SW1, SW2 and SW3, the printed circuit board PCB and the controller 40. Here, the support plate 38 is a reinforced member that has sufficient strength to accommodate the movement of the first operating member 30 during normal use. The support plate 38 can be attached to the gripping bracket 42 by suitable fasteners such as screws.

As seen in FIGS. 3 and 4, in the first embodiment, the first operating member 30 has a user operating part 50, a first actuating part 51 and a second actuating part 52. The second actuating part 52 is pivotally coupled to the support plate 38 by a pivot pin 53. The pivot pin 53 defines the first axis A1 of the first operating member 30. Here, the pivot pin 53 is formed by a bolt and nut. Preferably, as best seen in FIGS. 5 to 8, a torsion spring 54 is provided on the pivot pin 53 with one end of the torsion spring 54 contacting the support plate 38 and the other end of the torsion spring 54 contacting the second actuating part 52 to bias the second actuating part 52 against an abutment 55 of the support plate 38. The user operating part 50 is pivotally coupled to the first actuating part 51 by a pivot pin 56 to form a hinge. The pivot pin 56 defines the second axis A2. Preferably, a torsion spring 57 is provided on the pivot pin 56 with one end of the torsion spring 57 contacting the user operating part 50 and the other end of the torsion spring 57 contacting the first actuating part 51 to bias the user operating part 50 forwardly against the second operating member 36. The first actuating part 51 is pivotally coupled to the second actuating part 52 by a pivot pin 58. Here, the pivot pin 58 is formed by a bolt. The pivot pin 58 defines a fourth axis A4 that is parallel to the first axis A1 and is perpendicular to the second axis A2. Preferably, a torsion spring 59 is provided on the pivot pin 58 with one end of the torsion spring 59 contacting the first actuating part 51 and the other end of the torsion spring 59 contacting the second actuating part 52 to bias the first actuating part 51 against the second actuating part 52.

As seen in FIGS. 5 to 8, when the first operating member 30 is operated along the first path P1 the first operating member 30 moved from the rest position (FIG. 5) by first pivoting about the fourth axis A4 until an arm 51a of the first actuating part 51 engages an abutment 52a of the second actuating part 52 (FIG. 5). When the arm 51a of the first actuating part 51 engages the abutment 52a of the second actuating part 52 (the first position), the first electric switch SW1 is depressed by the arm 51a of the first actuating part 51. This depression of the first electric switch SW1 results in the first electric switch SW1 outputting the first signal to the controller 40. With the arm 51a of the first actuating part 51 engaged with the abutment 52a (notch) of the second actuating part 52, further movement of the first operating member 30 along the first path P1 results in the first and second actuating parts 51 and 52 moving together as a unit about the first axis A1. When the first operating member 30 is moved from the first position (FIG. 6) to the second position (FIG. 7), a projection 52b depresses the second electric switch SW2, which then output the second signal to the controller 40. When the first operating member 30 is moved from the second position (FIG. 7) to the third position (FIG. 8), the projection 52b depresses the third electric switch SW3, which then output the third signal to the controller 40. As seen in FIGS. 5 to 8, optionally, a clicking mechanism 60 can be provided to clearly indicate to the user when the first operating member 30 has reached the first, second and third positions. The biasing forces of the return springs of the first and second actuating parts 51 and 52 are each greater than the detent force of the clicking mechanism 60 so that the first operating member 30 automatically returns to the rest position upon release of the first operating member 30.

The second operating member 36 is movably coupled relative to the base member 28 to perform a braking operation upon being moved along the second path P2 (e.g., a braking path). In other words, the second operating member 36 is configured to move along the second path P2 differing from the first path P1 so as to actuate the hydraulic unit 34 in response to a movement along the second path P2. In particular, the second operating member 36 is pivotally attached to the base member 28 by a pivot pin 62. The hydraulic unit 34 is mounted on the base member 28, and configured to operate the hydraulic rear disc brake caliper 20 (i.e., a hydraulic brake device) as the second operating member 36 moves along the second path P2 (e.g., a braking path). When the second operating member 36 is pivoted about the third axis A3 along the second path P2, the second operating member 36 contacts the user operating part 50 of the first operating member 30 so that the user operating part 50 of the first operating member 30 pivots about the second axis A2 along the second path P2. The electric unit 32 is not operated as the user operating part 50 of the first operating member 30 pivots about the second axis A2 along the second path P2.

The hydraulic unit 34 is configured to operate a hydraulic device (the hydraulic rear disc brake caliper 20) that is coupled to the base member 28. The hydraulic unit 34 basically includes a cylinder 70, a piston 72 and a rod member 74. The cylinder 70 is provided on the base member 28. The piston 72 is movably arranged at the cylinder 70 so as to form a fluid chamber 76 in the cylinder 70. In particular, the piston 72 moves linearly within the cylinder 70 (i.e., reciprocates linearly within the cylinder 70) to force the hydraulic fluid out of the cylinder 70 to the hydraulic rear disc brake caliper 20 via the hydraulic hose 24. The piston 72 is coupled to the second operating member 36. In the first embodiment, the rod member 74 mechanically couples the second operating member 36 to the piston 72 so that movement of the second operating member 36 is transmitted to the piston 72. The hydraulic unit 34 is configured such that the piston 72 is pushed to reduce a volume of the fluid chamber 76. The cylinder 70 is arranged directly above the third axis A3 in a state where the bicycle control device 12 is fixed to the bicycle part (e.g., drop handlebar 14). The hydraulic unit 34 further includes a fluid reservoir 78 is in fluid communication with the cylinder 70. More specifically, the fluid chamber 76 of the cylinder 70 is fluidly connected to the fluid reservoir 78 by a passageway 80. The fluid reservoir 78 is arranged directly above the third axis A3 in a state where the bicycle control device 12 is fixed to the bicycle part (e.g., drop handlebar 14). The hydraulic unit 34 further includes a return spring 82. The return spring 82 is disposed in the cylinder 70 and biases the piston 72 towards a non-braking position.

As seen in FIG. 2, the controller 40 is basically a microcomputer that includes a central processing unit (CPU) or processor and conventional components such as an input interface circuit, an output interface circuit, and storage devices such as a ROM (Read Only Memory) device and a RAM (Random Access Memory) device as needed and/or desired. It will be apparent to those skilled in the art from this disclosure that the precise structure and algorithms for the main microcomputer can be any combination of hardware and software that will carry out the functions of the present invention. In the first embodiment, the controller 40 integrated together on the printed circuit board PCB and the first, second and third electric switches SW1, SW2 and SW3 are electrically connected to the printed circuit board PCB in a conventional manner. Alternatively, the controller 40 can be disposed outside of the base member 28 and electrically connected to the first, second and third electric switches SW1, SW2 and SW3 by an electrical cable. In this way, the controller 40 can be remotely disposed from the curved section 14a of the drop handlebar 14. When the bicycle control device 12 is used for synchro-mode control (e.g., synchro-shifting), the controller 40 is coupled to both the electric rear derailleur 18 (the electric transmission device) and the electric front derailleur 26 (the additional electric transmission device).

The controller 40 is programmed to output the first command to cause the first operation of the electric device (e.g., the electric rear derailleur 18) in response to receiving the first signal upon a state existing in which the second signal is absent within a predetermined period after receiving the first signal. In other words, the controller 40 outputs the first command only if the first signal is received and no second signal is subsequent received within a predetermined period (e.g., 0.2 second), after receiving the first signal. The controller 40 outputs a second command to cause the second operation of the electric device (e.g., the electric rear derailleur 18) in response to receiving the second signal. The controller 40 is configured not to output the first and second commands as the first operating member 30 moves toward the rest position. In the first embodiment, in the case of shifting, the first command is one of an upshift command and a downshift command of the electric transmission device, and the second command is the other of the upshift command and the downshift command. For example, the controller 40 is programmed such that the first command is an upshift command and the second command is a downshift command. If the third electric switch SW3 is used, then the controller 40 is further programmed such that the first command is the upshift command and the second and third commands are the downshift commands. In the case of synchro-shifting, the controller 40 is programmed such that the first command is one of an upshift command and a downshift command of the electric transmission device, the second command is the other of the upshift command and the downshift command, and the third command is a synchro-mode control command between the electric transmission device (e.g., the electric rear derailleur 18) and the additional electric transmission device (e.g., the electric front derailleur 26).

Figure 9:
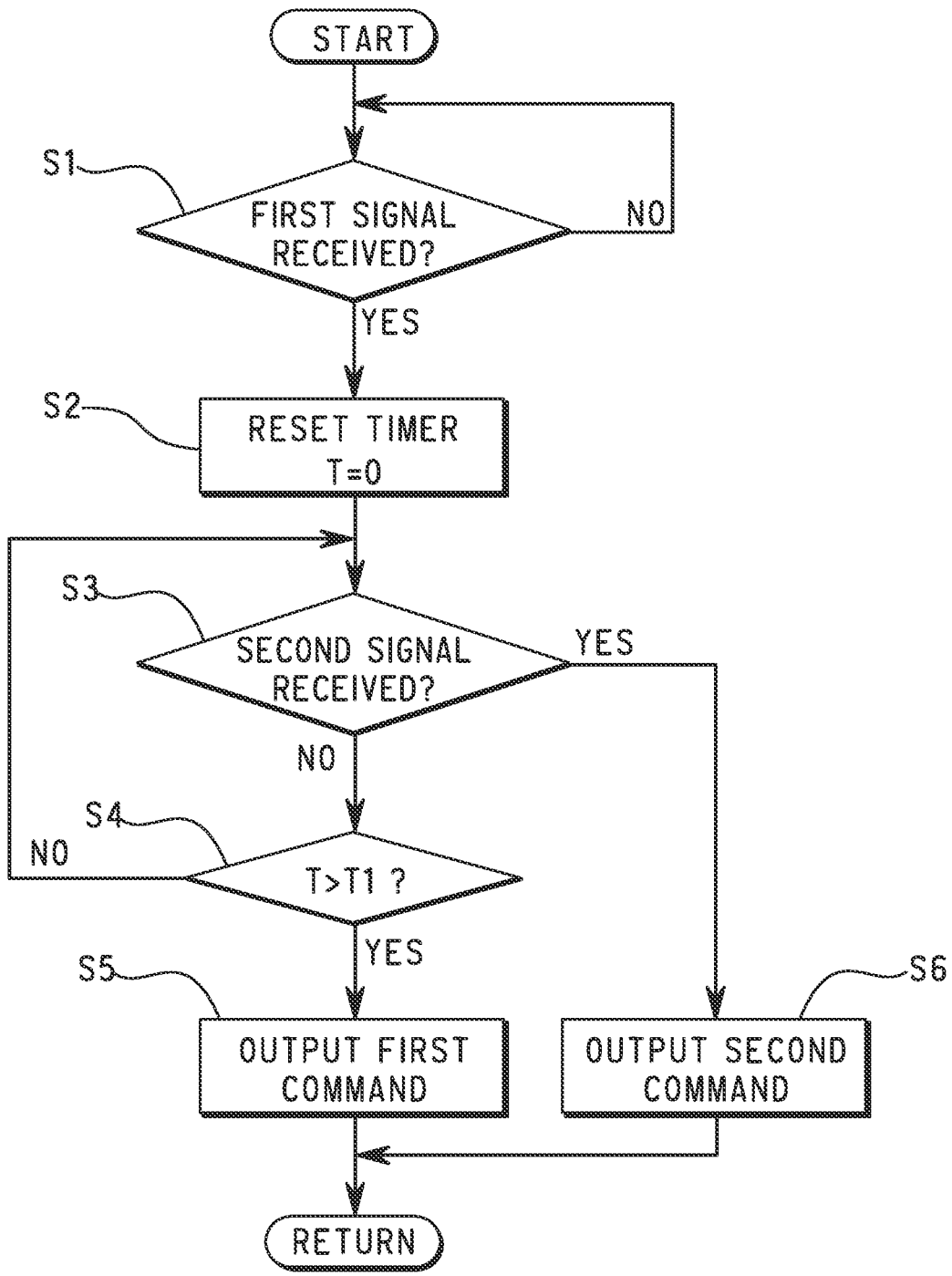
FIG. 9 is a first flow chart illustrating a first control process that is executed by the controller of the bicycle control device in response to the operation of the first operating member.

Referring now to FIG. 9, a first control process will now be discussed with respect to the operation of the first operating member 30 for operating the electric rear derailleur 18. The first control process is stored in the memory of the controller 40. The first control process is used when the third electric switch SW3 is either not present or deactivated. The controller 40 receives electric signals from the first and second electric switches SW1 and SW2 during the first control process. The controller 40 ignores the electric signals from the first and second electric switches SW1 and SW2 during the return stroke of first operating member 30 based on the sequence of the operation of the first and second electric switches SW1 and SW2.

Figure 6:
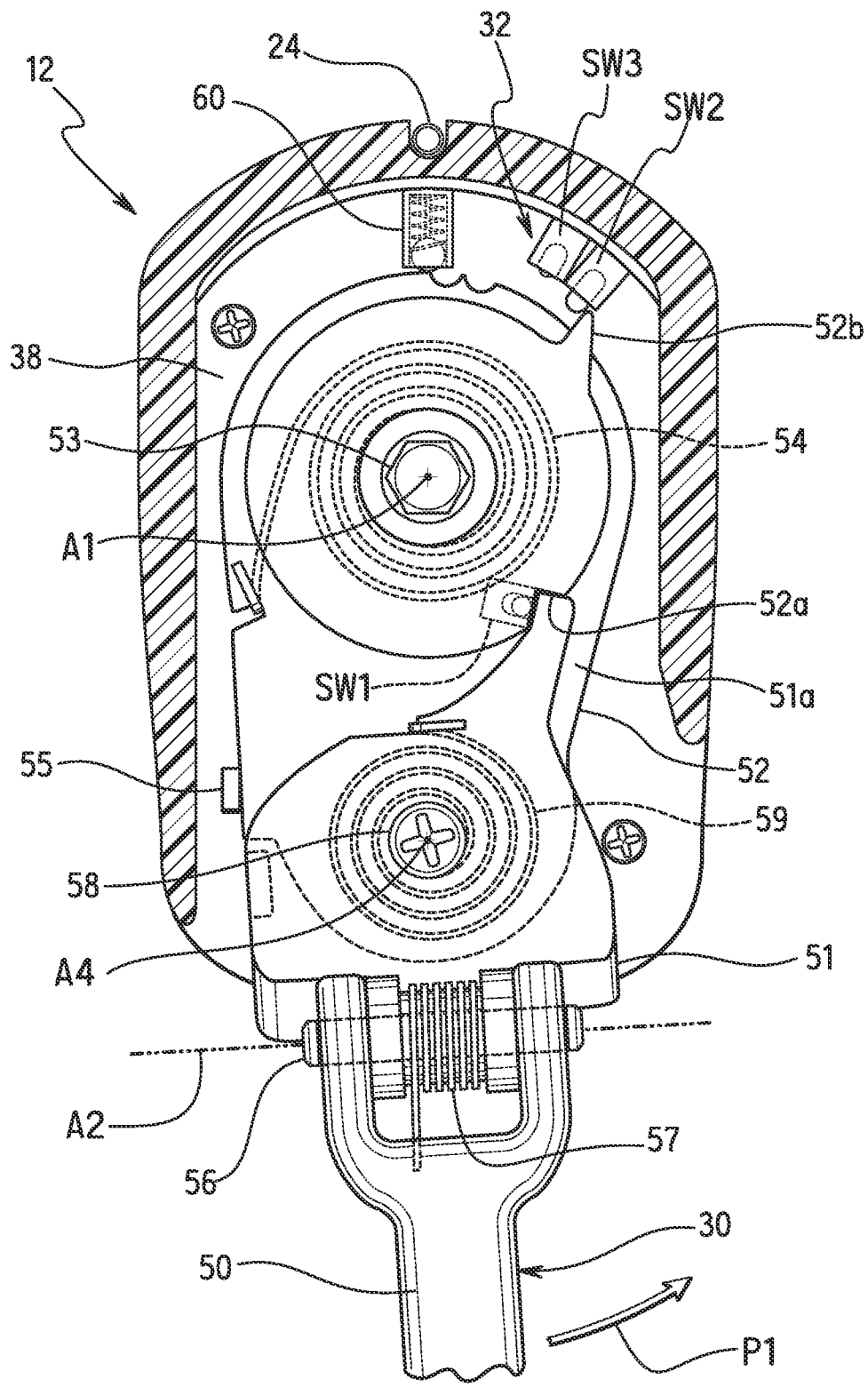
FIG. 6 is an enlarged cross sectional view, similar to FIG. 5, of the bicycle control device illustrated in FIGS. 1 and 3 with the first operating member moved from the rest position to a first position corresponding to a first shift actuating position in which a first electric switch is actuated (i.e., depressed)

In step S1, the controller 40 continuously checks to determine if the first signal has been received from the first electric switch SW1. As mentioned above, the first signal is produced by the first electric switch SW1 upon detecting the first operating member 30 has reached the first position as seen in FIG. 6. Once the first signal is received by the controller 40, the process proceeds to step S2.

In step S2, the controller 40 resets a timer (not shown) to zero (i.e., T=0). The timer can be either a software timer or a hardware timer provided on the printed circuit board PCB. The timer is used countdown a time period to determine whether or not to output the first command in response to receiving the first signal from the first electric switch SW1. In particular, after receiving the first signal from the first electric switch SW1, the controller 40 will only output the first command if the second signal is not received within a predetermined period T1 (i.e., a first threshold, e.g., 0.2 second). Preferably, the controller 40 is configured such that the predetermined period T1 can be adjusted by a user as needed and/or desired. Thus, the controller 40 waits to output the first command until the predetermined period T1 has lapsed so as to determine whether or not to output the second command instead of the first command.

Figure 7:
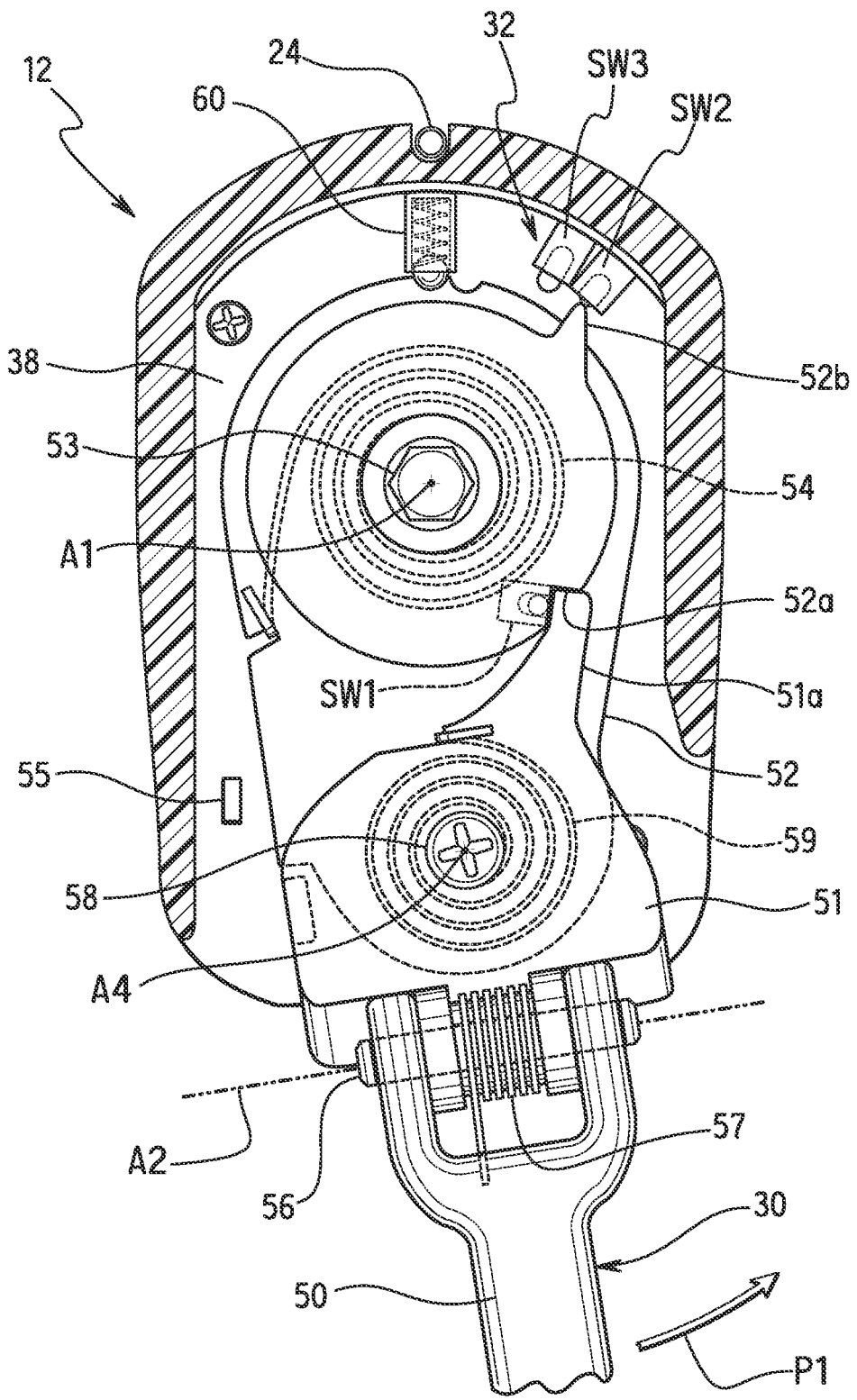
FIG. 7 is an enlarged cross sectional view, similar to FIGS. 5 and 6, of the bicycle control device illustrated in FIGS. 1 and 3 with the first operating member moved from the first position of FIG. 6 to a second position corresponding to a second shift actuating position in which a second electric switch is actuated (i.e., depressed)

In step S3, the controller 40 determines if the second signal has been received from the second electric switch SW2. As mentioned above, the second signal is produced by the second electric switch SW2 upon detecting the first operating member 30 has reached the second position as seen in FIG. 7. If the second signal has not been received, the controller 40 proceeds to step S4.

In step S4, the controller 40 determines if the predetermined period T1 has lapsed. If the predetermined period T1 has not lapsed (i.e., T<T1), then the controller 40 proceeds back to step S3. If the predetermined period T1 has lapsed (i.e., T>T1), then the controller 40 proceeds to step S5. In step S5, the controller 40 outputs the first command (e.g., an upshift command) to the electric device (e.g., the electric rear derailleur 18). After outputting the first command, the controller 40 proceeds back to step S1.

In step S3, if the second signal has been received from the second electric switch SW2 (i.e., the first operating member 30 has been operated past the first position to actuate the second electric switch SW2), then the controller 40 proceeds to step S6. In step S6, the controller 40 outputs the second command (e.g., a downshift command) to the electric device (e.g., the electric rear derailleur 18). In this way, the electric device (e.g., the electric rear derailleur 18) is only operated in accordance with the second command (e.g., a downshift command) in a single progressive stroke in a single direction along the first path P1 from the rest position (FIGS. 3 and 5) through the first position (FIG. 6) to the second position (FIG. 7). After outputting the second command, the controller 40 proceeds back to step S1. When the control process returns to the start again, the controller 40 waits for the first electric switch SW1 to be no longer actuated before carrying out the next command.

Figure 10:
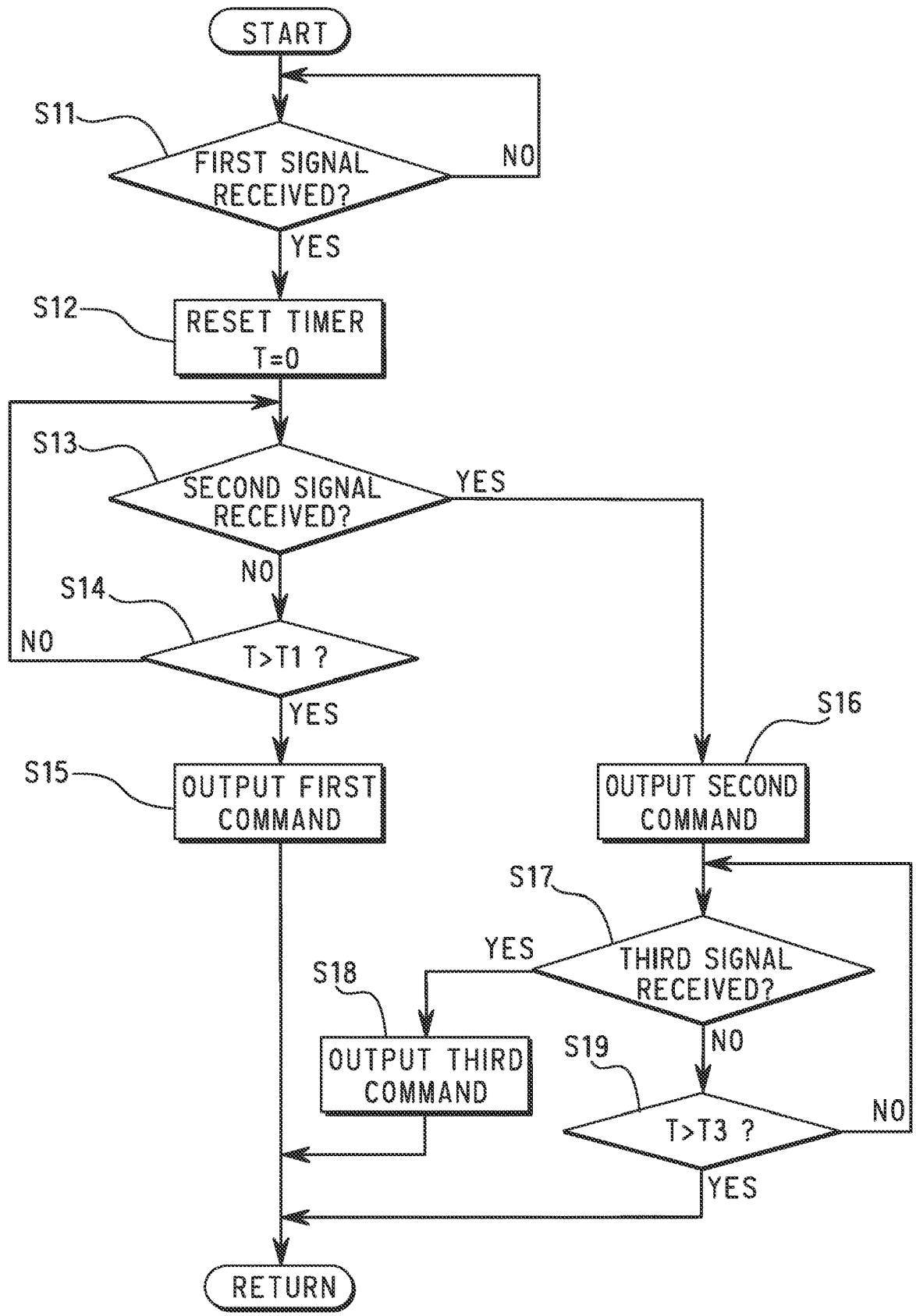
FIG. 10 is a second flow chart illustrating a second control process that is executed by the controller of the bicycle control device in response to the operation of the first operating member.

Referring now to the flow chart of FIG. 10, a second control process is illustrated that can be selected by the rider, and then executed by the controller 40 in response to operation of the first operating member 30. The second control process is stored in the memory of the controller 40. The second control process is used when the third electric switch SW3 is present and activated. The controller 40 receives electric signals from the first, second and third electric switches SW1, SW2 and SW3 during the second control process. The controller 40 ignores the electric signals from the first, second and third electric switches SW1, SW2 and SW3 during the return stroke of first operating member 30 based on the sequence of the operation of the first, second and third electric switches SW1, SW2 and SW3. For the sake of brevity, steps S11 to S16 of the second control process of FIG. 10 will not be repeated because they are the same as steps S1 to S6 of the first control process of FIG. 9.

Figure 8:
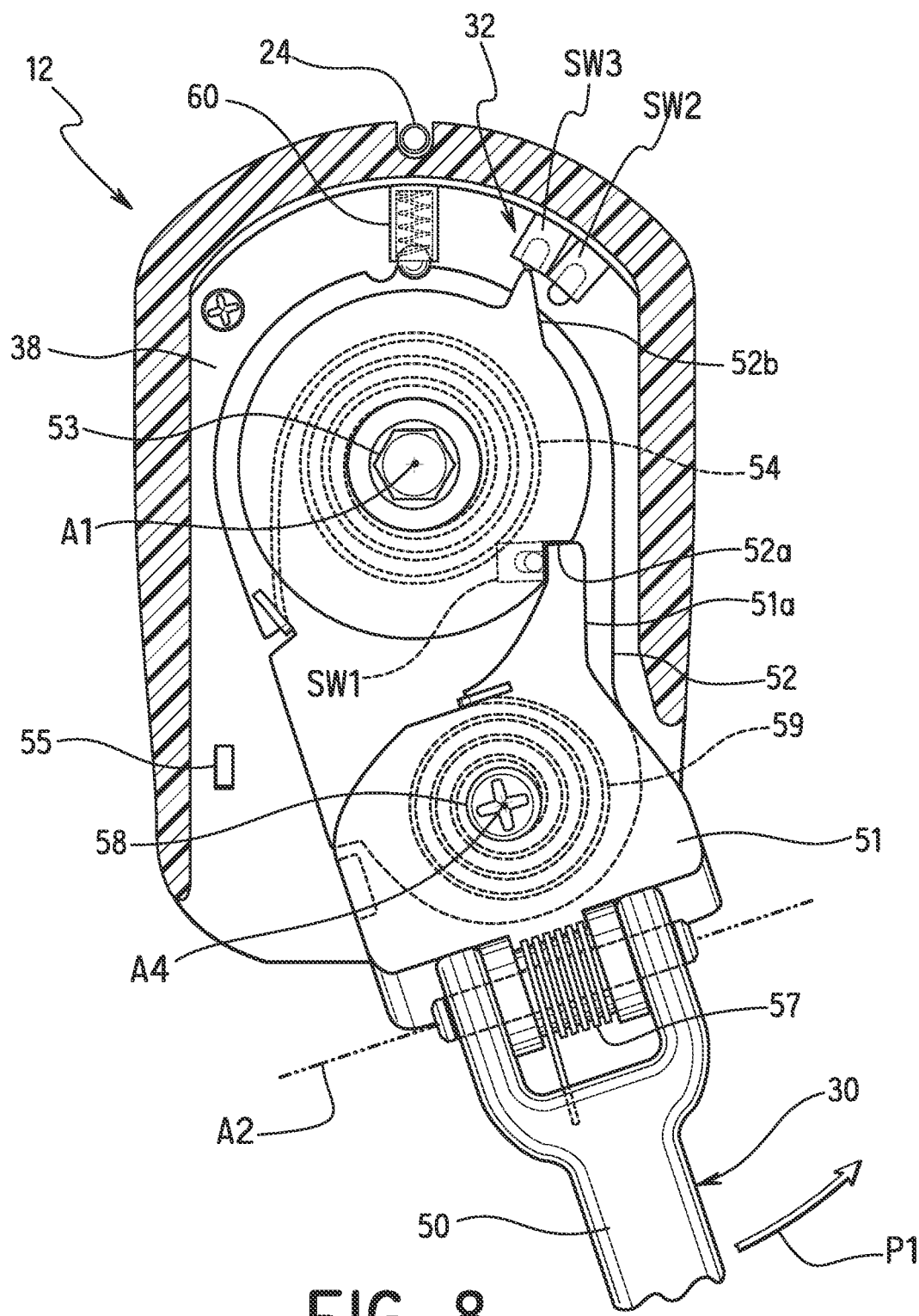
FIG. 8 is an enlarged cross sectional view, similar to FIGS. 5 to 7, of the bicycle control device illustrated in FIGS. 1 and 3 with the first operating member moved from the second position of FIG. 7 to a third position corresponding to a third shift actuating position in which a third electric switch is actuated (i.e., depressed)

After outputting the second command in step S16, the controller 40 proceeds to step S17 to determine if the third signal has been received from the third electric switch SW3. As mentioned above, the third signal is produced by the third electric switch SW3 upon detecting the first operating member 30 has reached the third position as seen in FIG. 8. If the third signal is received by the controller 40, the process proceeds to step S18.

In step S18, the controller 40 outputs the third command (e.g., a second downshift command) to the electric device (e.g., the electric rear derailleur 18). In this way, the electric device (e.g., the electric rear derailleur 18) is operated twice in a single progressive stroke in a single direction along the first path P1 from the rest position (FIGS. 3 and 5) through the first and second positions (FIGS. 6 and 7) to the third position (FIG. 8). After outputting the third command, the controller 40 proceeds back to step S11. When the control process returns to the start again, the controller 40 waits for the first electric switch SW1 to be no longer actuated before carrying out the next command.

Figure 11:
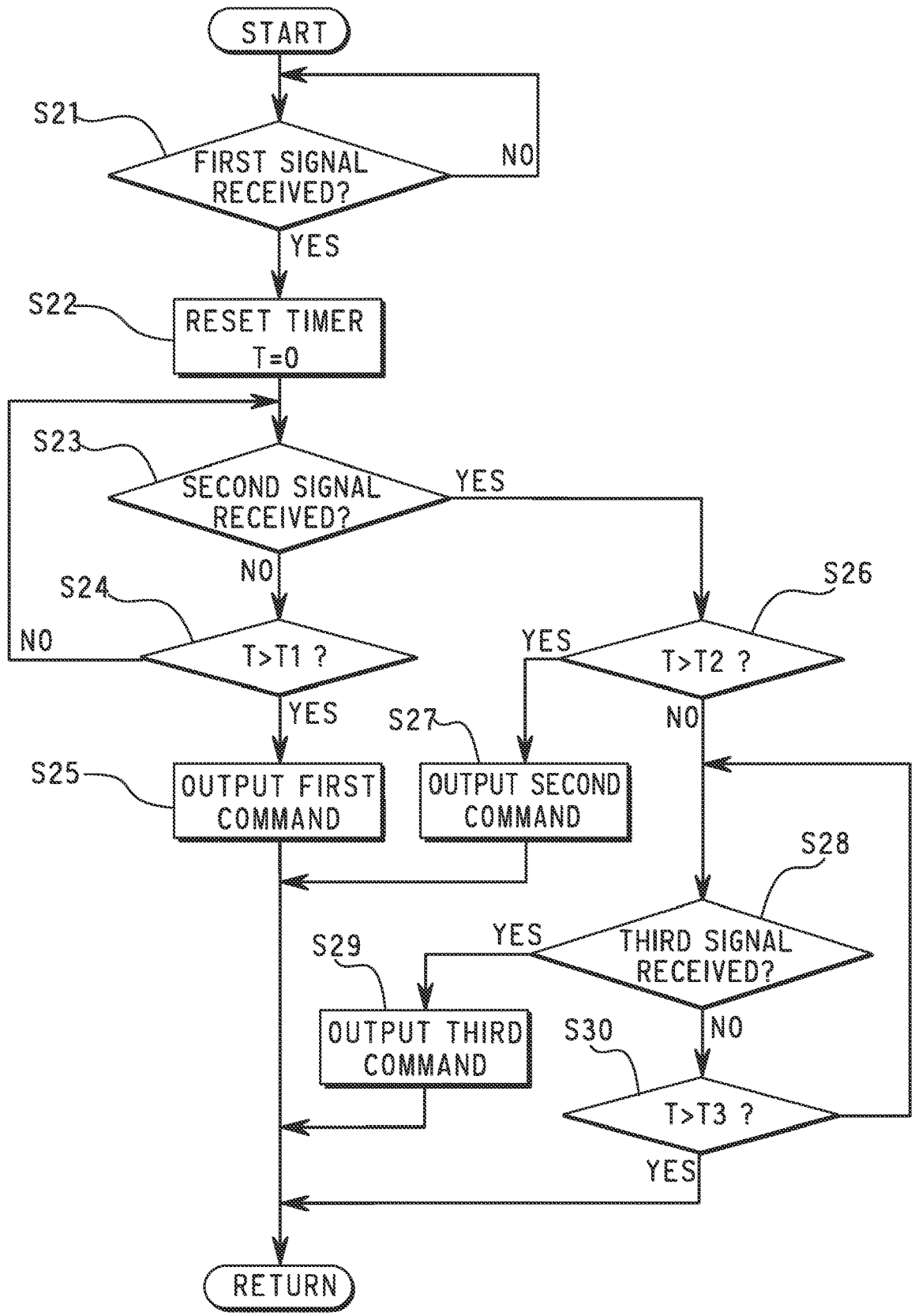
FIG. 11 is a third flow chart illustrating a third control process that is executed by the controller of the bicycle control device in response to the operation of the first operating member.

Referring now to the flow chart of FIG. 11, a third control process is illustrated that can be selected by the rider, and then executed by the controller 40 in response to operation of the first operating member 30. The third control process is stored in the memory of the controller 40. The third control process is used when the third electric switch SW3 is present and activated. The controller 40 receives electric signals from the first, second and third electric switches SW1, SW2 and SW3 during the third control process. The controller 40 ignores the electric signals from the first, second and third electric switches SW1, SW2 and SW3 during the return stroke of first operating member 30 based on the sequence of the operation of the first, second and third electric switches SW1, SW2 and SW3. For the sake of brevity, steps S21 to S25 of the third control process of FIG. 11 will not be repeated because they are the same as steps S1 to S5 of the first control process of FIG. 9.

In step S26, after the second signal has been received, the controller 40 determines if a predetermined period T2 (i.e., a second threshold, e.g., 0.2 second) has lapsed. Preferably, the controller 40 is configured such that the predetermined period T2 can be adjusted by a user as needed and/or desired. If the predetermined period T2 has lapsed (i.e., T>T2), then the controller 40 proceeds to step S27. In step S27, the controller 40 outputs the second command (e.g., an upshift or downshift command).

In step S26, if the predetermined period T2 has not lapsed (i.e., T<T2), then the controller 40 proceeds to step S28 to determine if the third electric switch SW3 has been actuated.

In step S28, the controller 40 determines if the third signal has been received from the third electric switch SW3. As mentioned above, the third signal is produced by the third electric switch SW3 upon detecting the first operating member 30 has reached the third position as seen in FIG. 8. In step S28, if the third signal has been received, the controller 40 proceeds to step S29.

In step S29, the controller 40 outputs the third command (e.g., a synchro-mode control command) to two of the electric devices (e.g., the derailleurs 18 and 26) so as to perform a synchronized control of the two electric devices (e.g., the derailleurs 18 and 26). Since synchronized shifting is known within the bicycle field, a synchronized shifting pattern will not be presented herein for the sake of brevity. After outputting the third command, then the controller 40 returns to the beginning of the third control process (i.e., step S21). When the control process returns to the start again, the controller 40 waits for the first electric switch SW1 to be no longer actuated before carrying out the next command.

In step S28, if the third signal has not been received, the controller 40 proceeds to step S30. In step S30, the controller 40 determines if a predetermined period T3 (i.e., a third threshold, e.g., 0.2 second) has lapsed. Preferably, the controller 40 is configured such that the predetermined period T3 can be adjusted by a user as needed and/or desired. If the predetermined period T3 has lapsed (i.e., T>T3), then the controller 40 returns to the beginning of the third control process (i.e., step S21). If the predetermined period T3 has not lapsed (i.e., T<T3), then the controller 40 continuously repeats step S30 until the predetermined period T3 has lapsed (i.e., T>T3).

Figure 12:
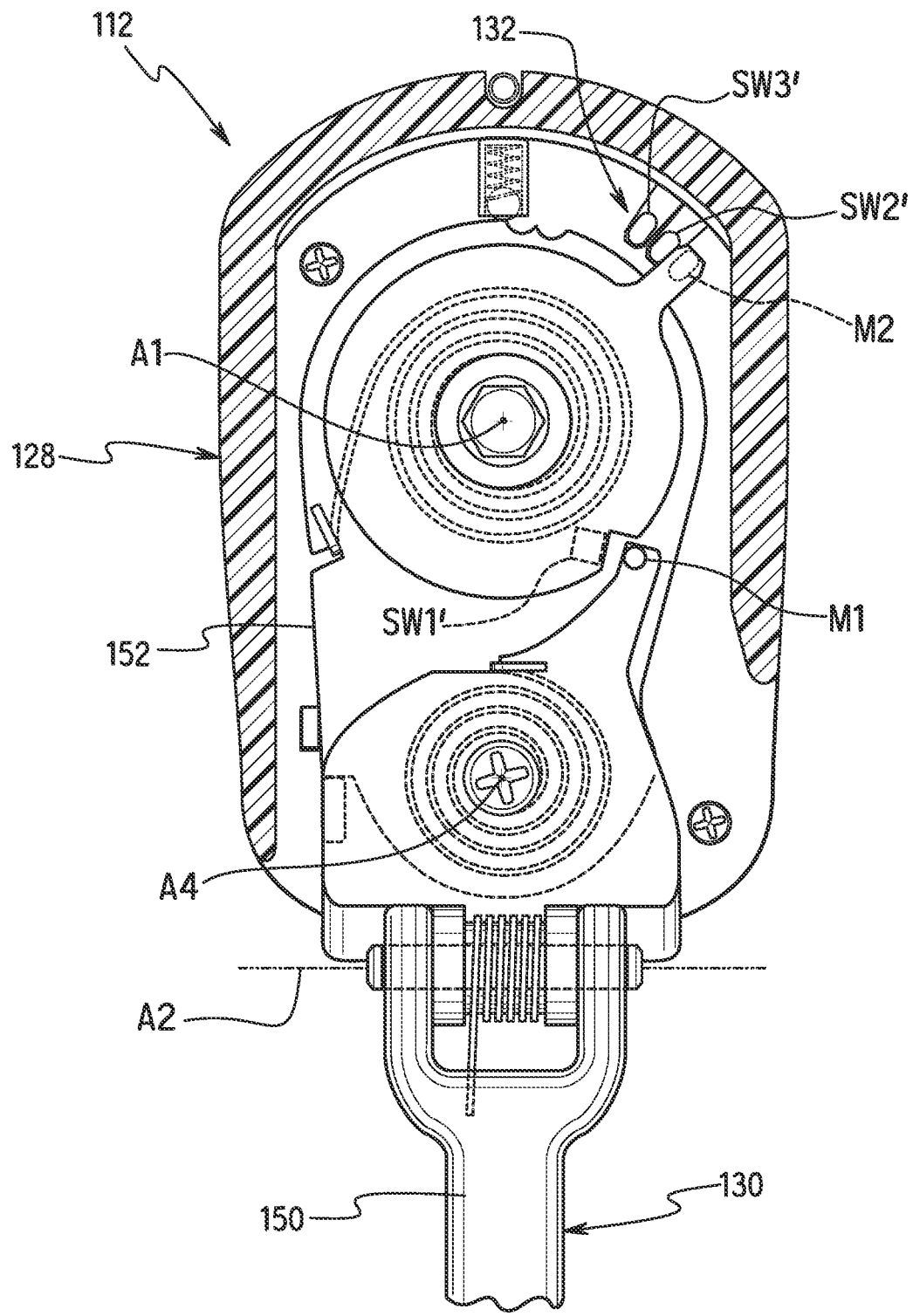
FIG. 12 is an enlarged cross sectional view, similar to FIG. 5, of a bicycle control device that uses non-contact switches in accordance with a second embodiment with the first operating member in the rest position or non-operated position.

Referring now to FIG. 12, a bicycle control device 112 is illustrated in accordance with a second embodiment. The bicycle control device 112 includes a base member 128, a first operating member or lever 130 and an electric unit 132. Although not shown, the bicycle control device 112 includes a hydraulic unit, a second operating member and a controller that are identical to the hydraulic unit 34, a second operating member 36 and a controller 40 as discussed above. In the second embodiment, the first operating member 130 operates the electric unit 132 in the same manner as the first embodiment. Thus, the first operating member 130 includes a user operating part 150, a first actuating part 151 and a second actuating part 152. The second actuating part 152 pivots relative to the base member 128 about the first axis A1 similar to the first embodiment. The user operating part 150 pivots relative to the base member 128 about the second axis A2 similar to the first embodiment. The first actuating part 151 pivots relative to the base member 128 about the fourth axis A4 similar to the first embodiment.

The bicycle control device 112 is identical to the bicycle control device 12 of the first illustrated embodiment, except that the electric switches SW1, SW2 and SW3 have been replaced with electric switches SW1', SW2' and SW3' and the first operating member 130 has been provided with first and second magnets M1 and M2. The electric switches SW1', SW2' and SW3' are non-contact switches such as Hall Effect elements, reed switch, etc. Alternatively, the electric switches SW1', SW2' and SW3' can be optical sensors. The electric switch SW1' is actuated when the first magnet M1 moves within a prescribed distance of the electric switch SW1'. Likewise, the electric switch SW2' is actuated when the second magnet M2 moves within a prescribed distance of the electric switch SW2', and the electric switch SW3' is actuated when the second magnet M2 moves within a prescribed distance of the electric switch SW3'. In view of the similarity between the first and second embodiments, the bicycle control device 112 will not be discussed and/or illustrated in more detail herein.

Figure 13:
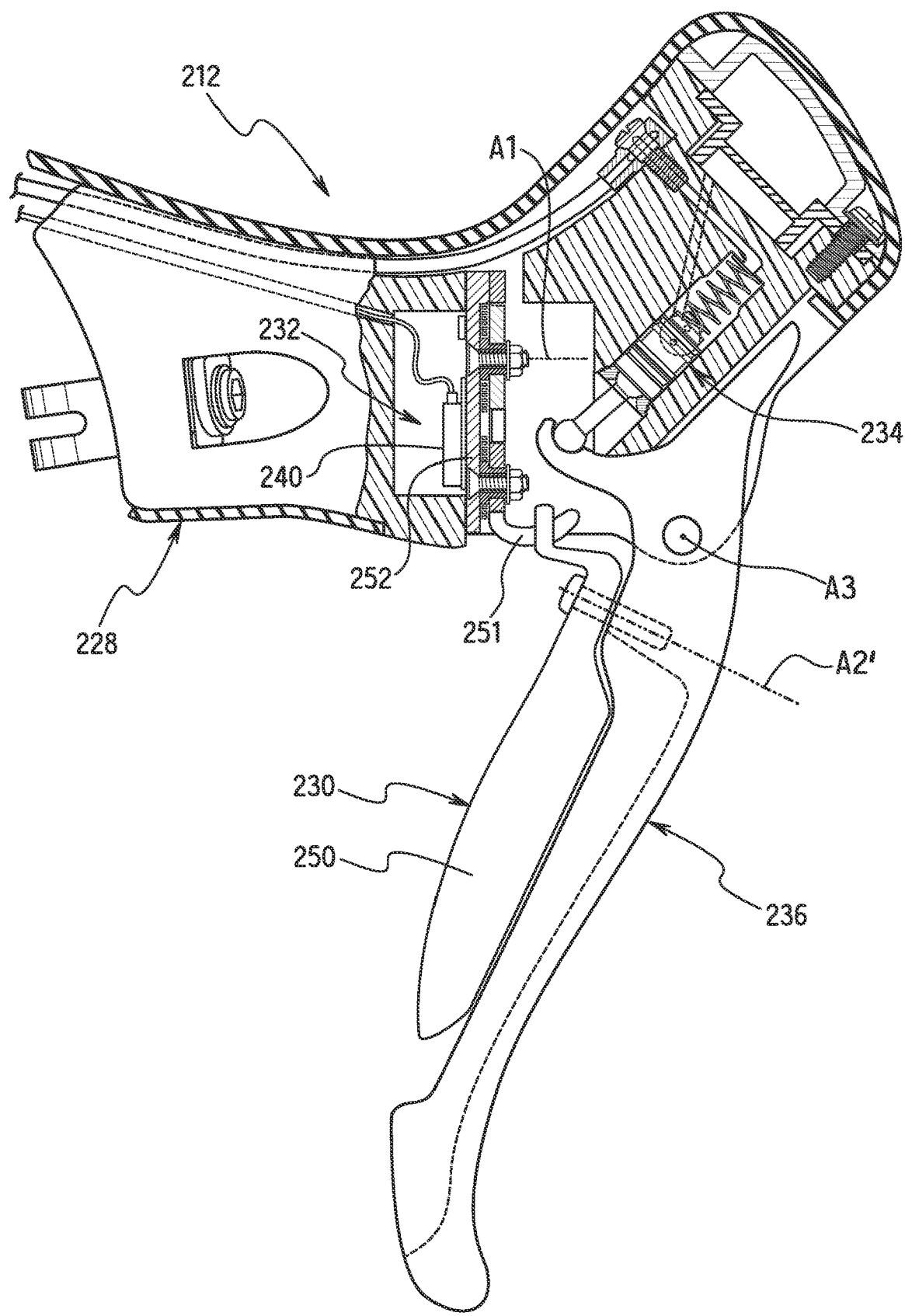
FIG. 13 is a cross sectional view of a bicycle control device in accordance with a third embodiment with the first and second operating members in rest positions or non-operated positions.
Figure 14:
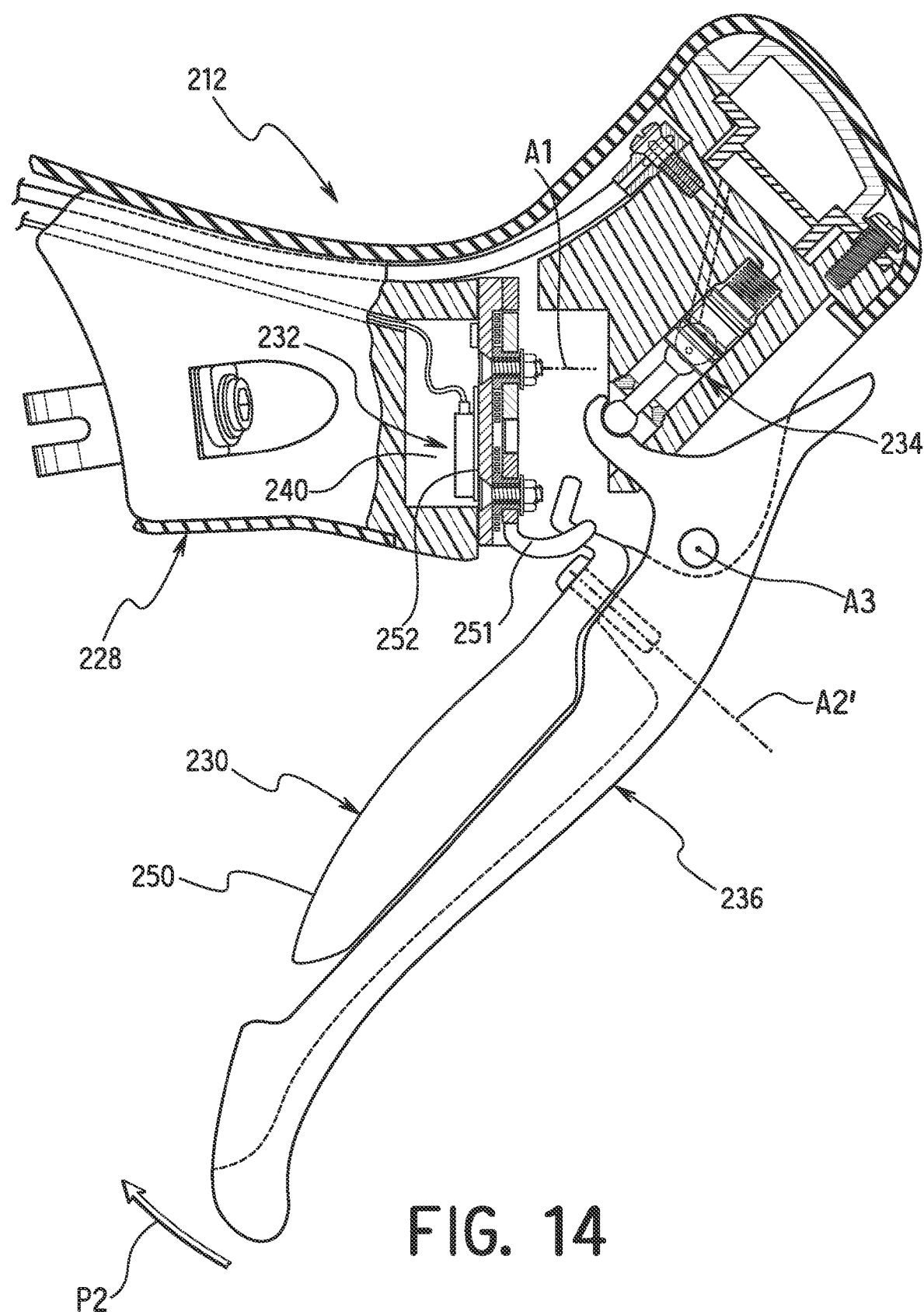
FIG. 14 is a cross sectional view of the bicycle control device illustrated in FIG. 13 with the second operating member moved from the rest position to a braking position or operated position and the first operating member being moved by the second operating member moved from the rest position to non-actuating position.
Figure 15:
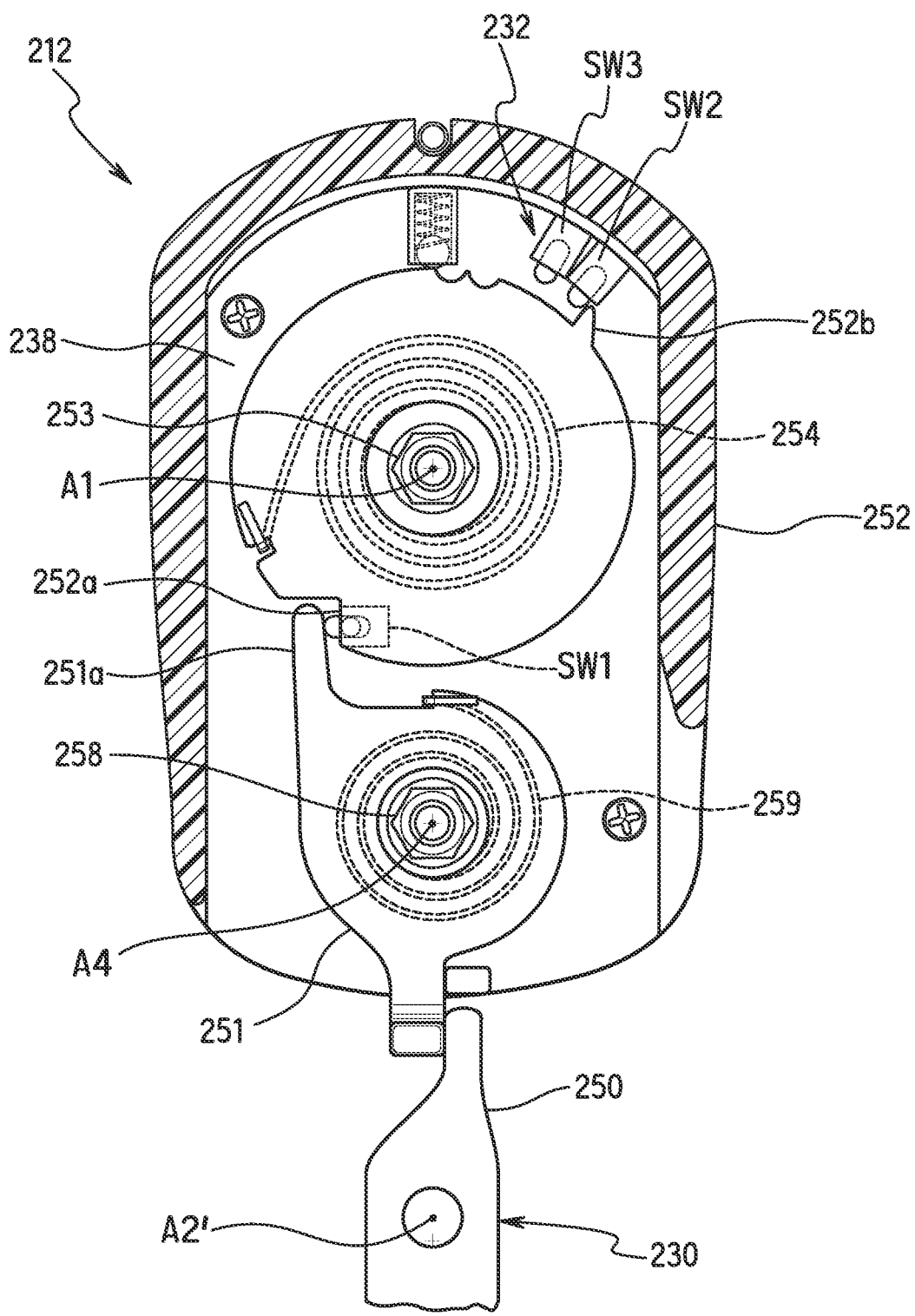
FIG. 15 is an enlarged cross sectional view of the bicycle control device illustrated in FIGS. 13 and 14 with the first operating member in the rest position or non-operated position.
Figure 16:
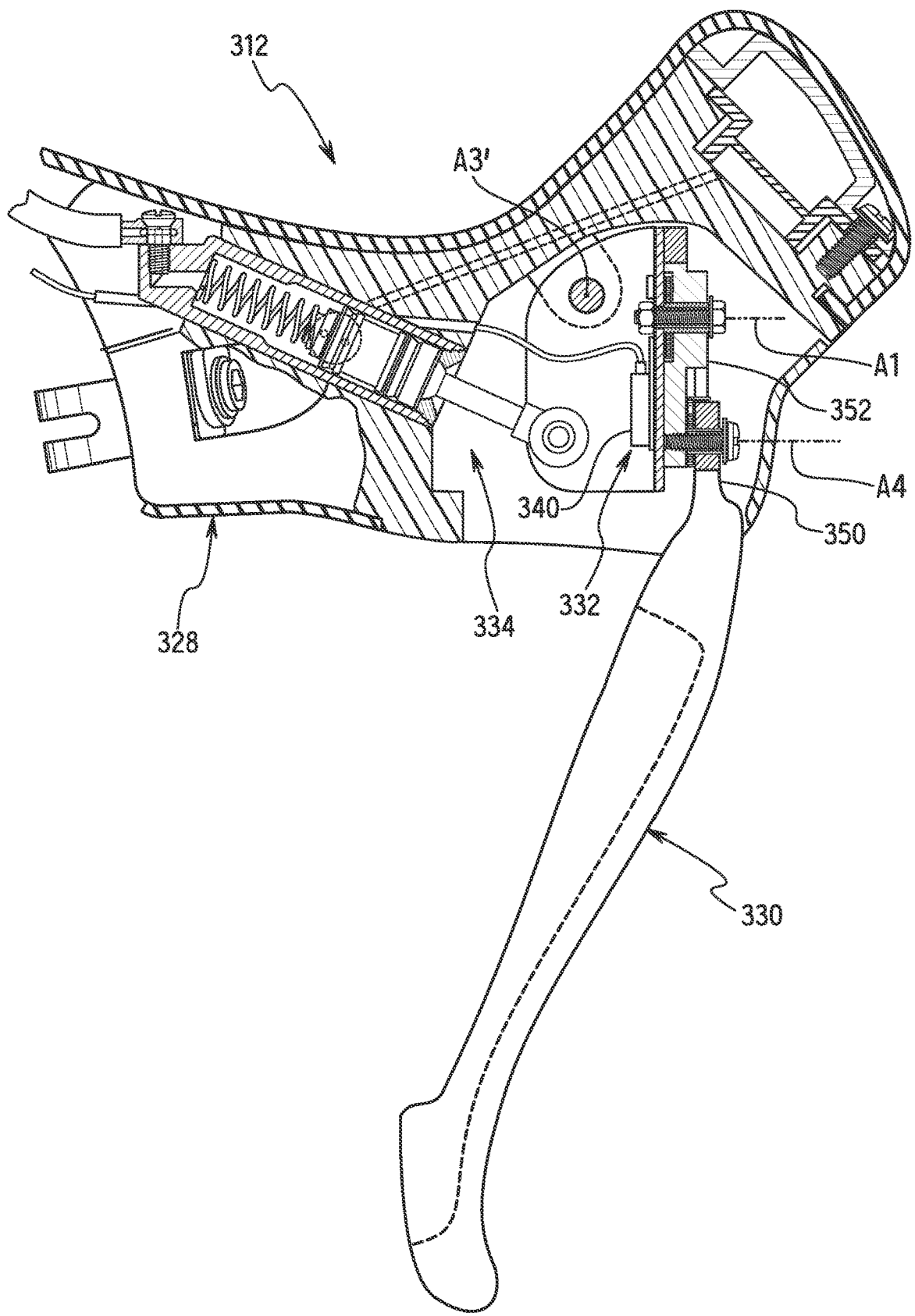
FIG. 16 is a cross sectional view of a bicycle control device in accordance with a fourth embodiment with the operating member in a rest position or non-operated position.
Figure 17:
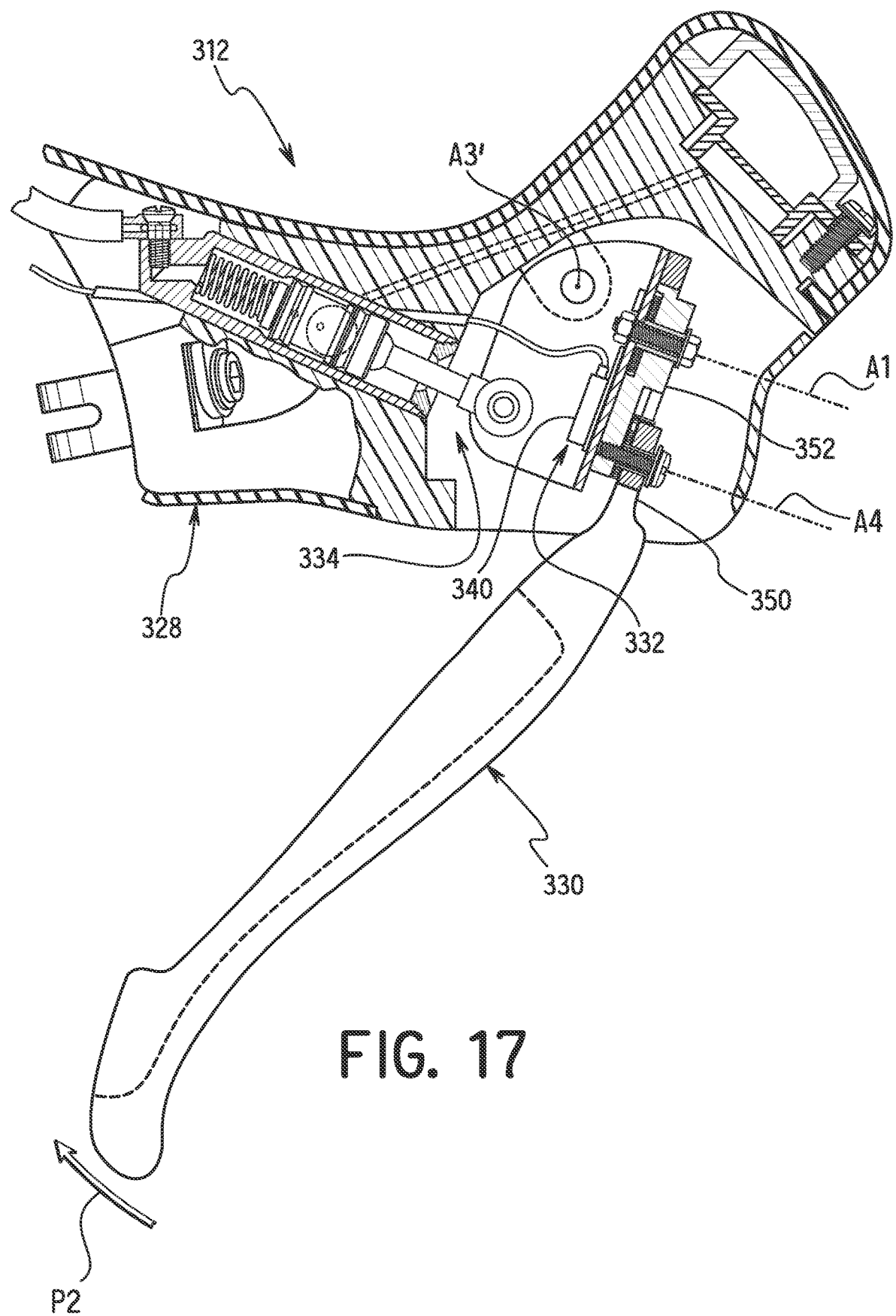
FIG. 17 is a cross sectional view of the bicycle control device illustrated in FIG. 16 with the operating member moved from the rest position to a braking position or operated position.
Figure 18:
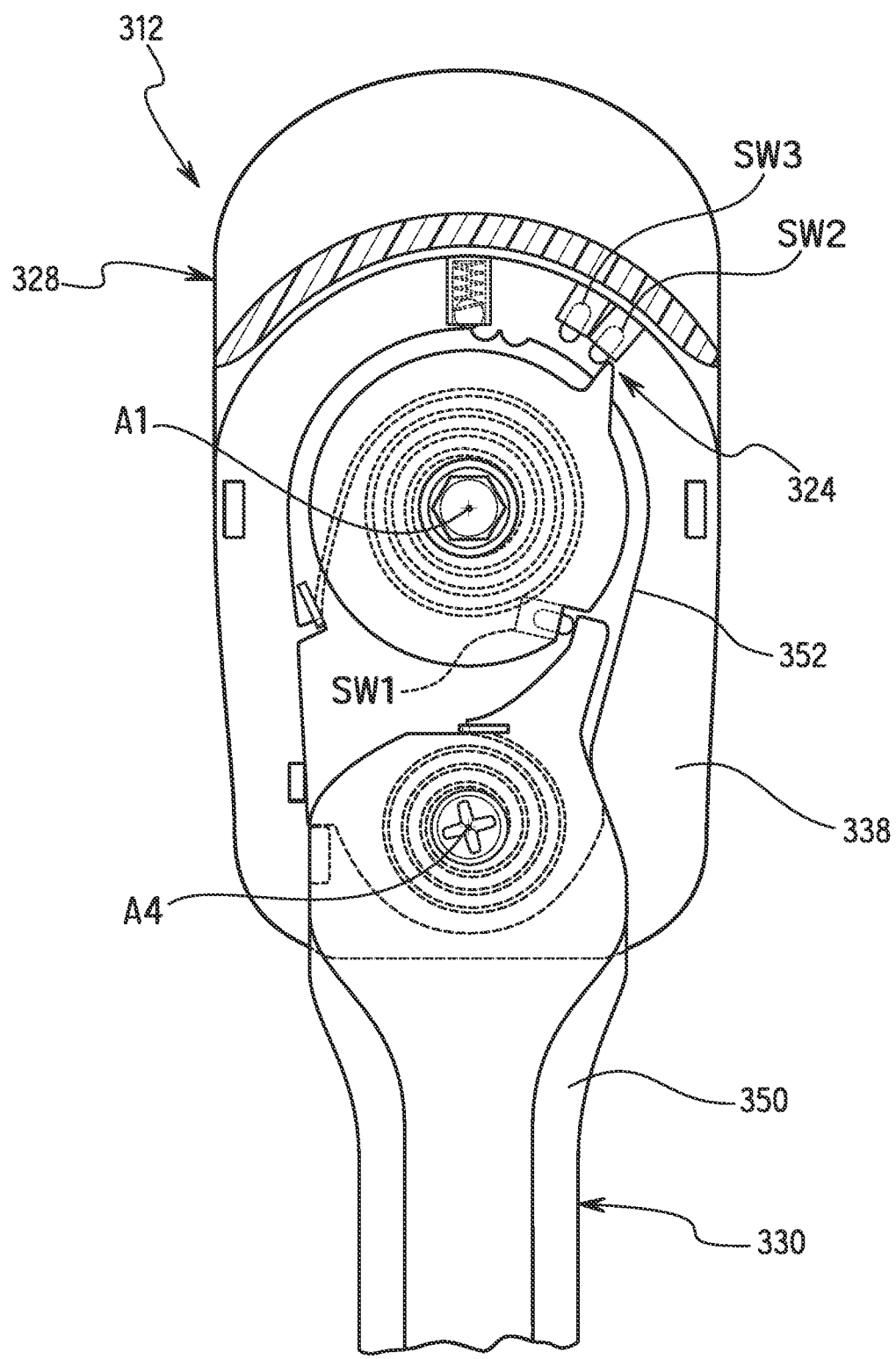
FIG. 18 is an enlarged front devotional view of an upper portion of the bicycle control device illustrated in FIGS. 16 and 17 with the operating member in the rest position or non-operated position.
Figure 19:
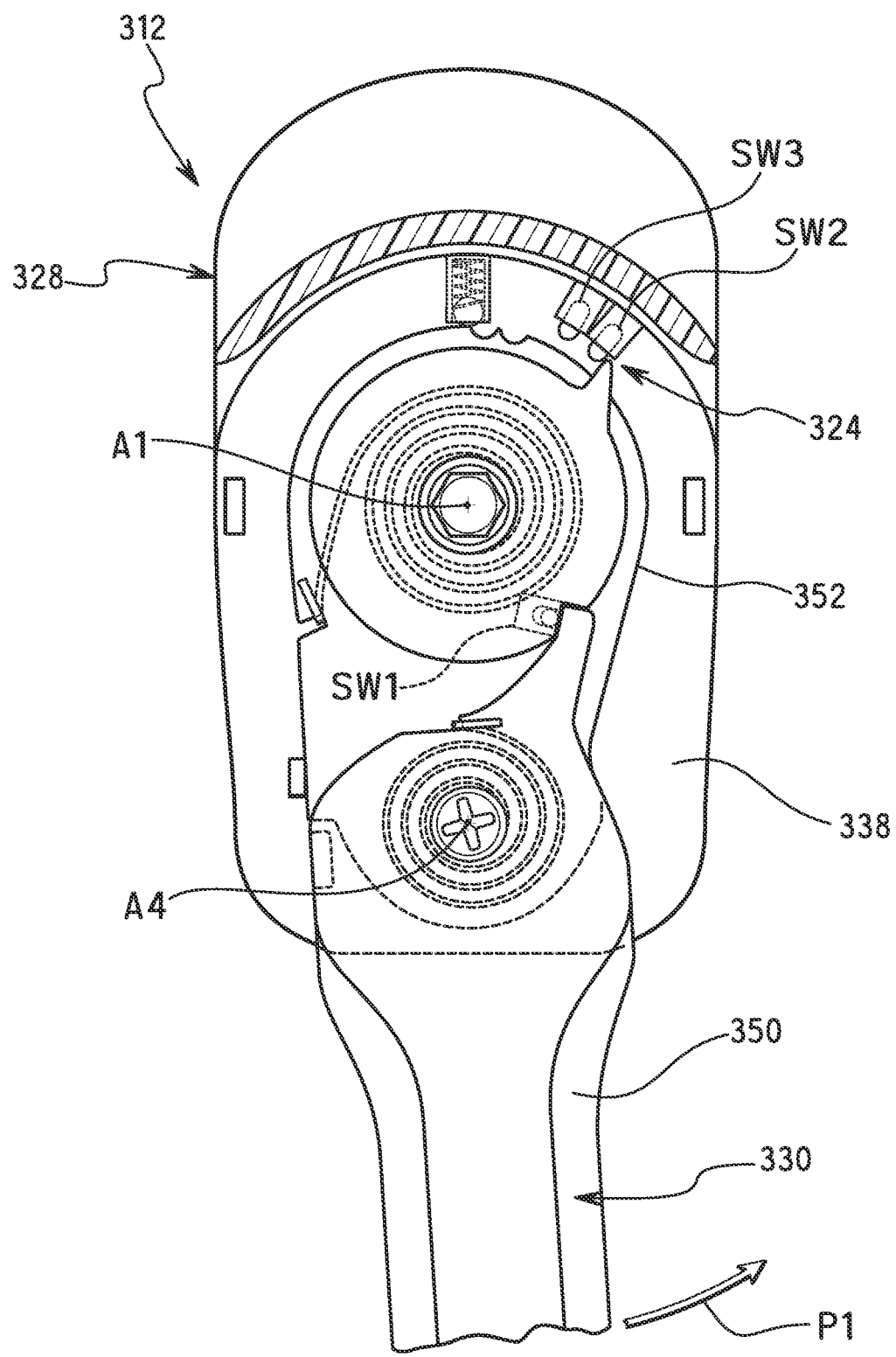
FIG. 19 is an enlarged front elevational view, similar to FIG. 18, of the upper portion of the bicycle control device with the operating member moved from the rest position to a first position corresponding to a first shift actuating position in which a first electric switch is actuated (i.e., depressed)
Figure 20:
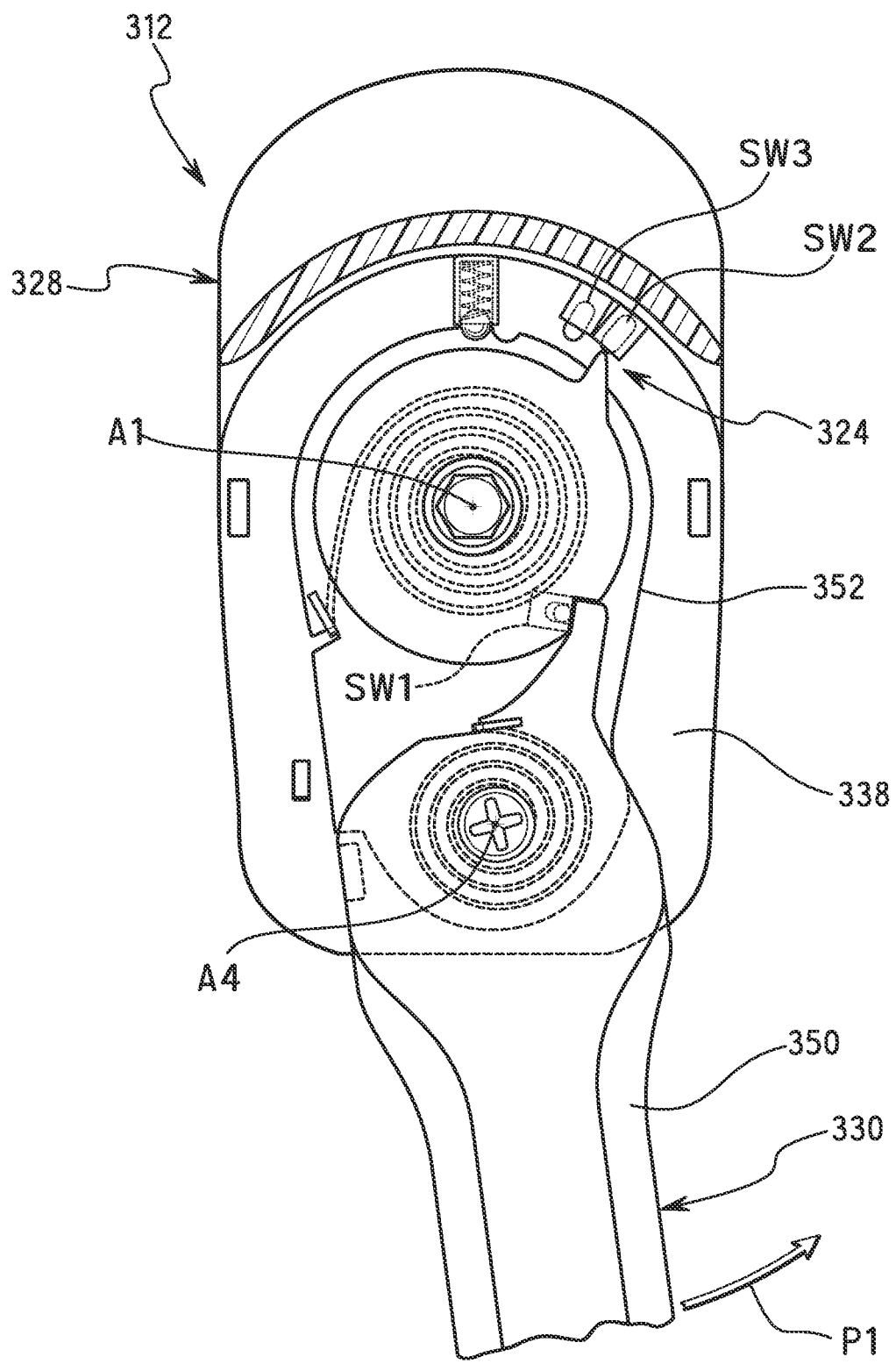
FIG. 20 is an enlarged front elevational view, similar to FIGS. 18 and 19, of the upper portion of the bicycle control device with the operating member moved from the first position of FIG. 19 to a second position corresponding to a second shift actuating position in which a second electric switch is actuated (i.e., depressed)
Figure 21:
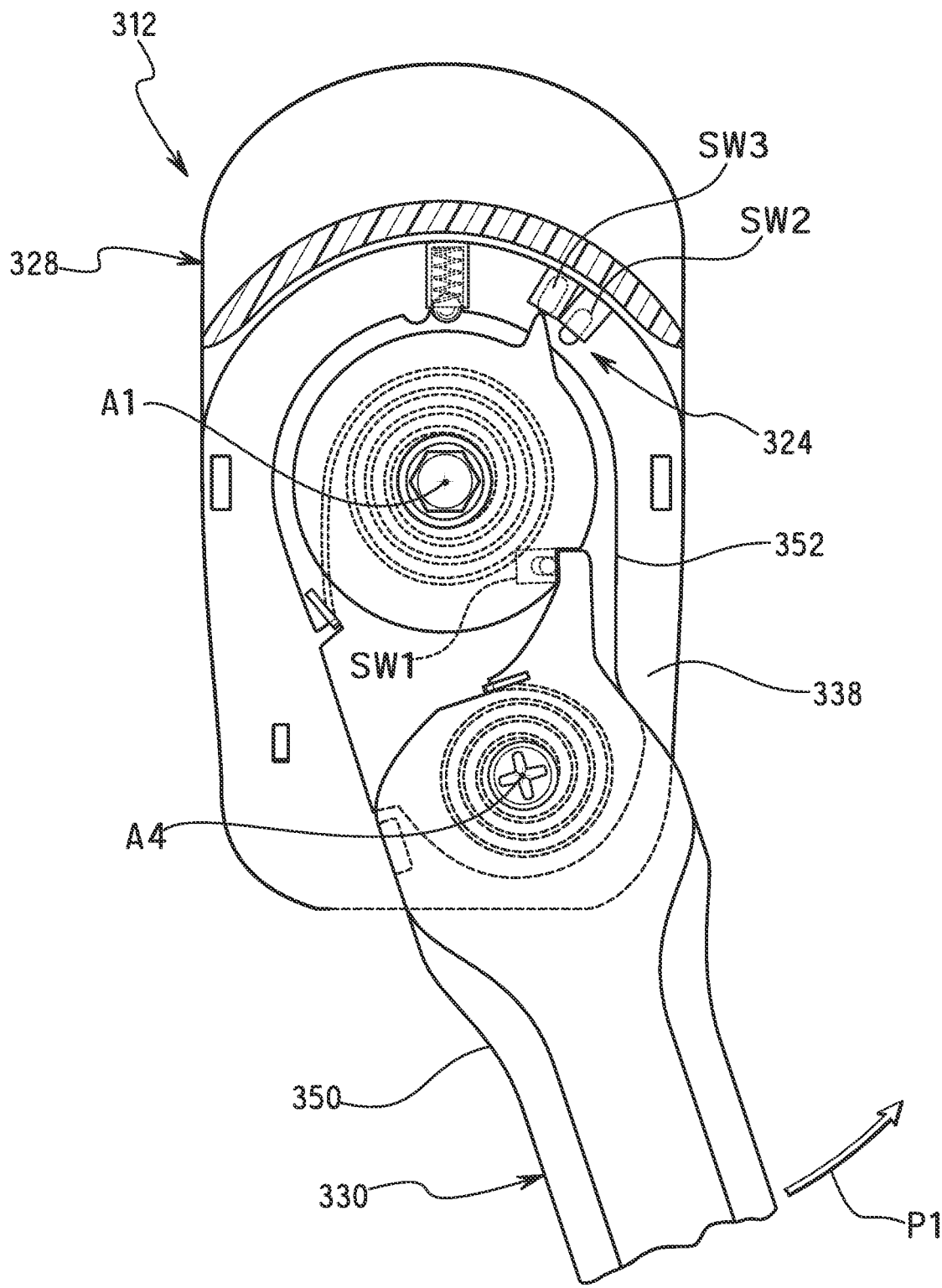
FIG. 21 is an enlarged front elevational view, similar to FIGS. 18 to 20, of the upper portion of the bicycle control device with the operating member moved from the second position of FIG. 20 to a third position corresponding to a third shift actuating position in which a third electric switch is actuated (i.e., depressed).

Referring now to FIGS. 13 to 15, a bicycle control device 212 is illustrated in accordance with a third embodiment. The bicycle control device 212 includes a base member 228, a first operating member or lever 230, an electric unit 232, a hydraulic unit 234, a second operating member or lever 236, a support plate 238 and a controller 240. The first operating member 230 includes a user operating part 250, a first actuating part 251 and a second actuating part 252. Here, the second actuating part 252 pivots relative to the base member 228 about the first axis A1 by a pivot pin 253 similar to the first embodiment. The second actuating part 252 is biased against an abutment of the support plate 238 by a torsion spring 254 to establish a rest position of the second actuating part 252. The user operating part 250 is pivotally mounted on second operating member 236 to pivot about a second axis A2' to pivot the first actuating part 251 relative to the base member 228 about the fourth axis A4. Here, the second axis A2' is not parallel to the third axis A3. The first actuating part 251 pivots relative to the base member 228 about the fourth axis A4 similar to the first embodiment.

When the first actuating part 251 pivots about the fourth axis A4 as a result of the operation of the first operating member 30 along the first path P1, an arm 251a of the first actuating part 251 engages an abutment 252a of the second actuating part 252. When the arm 251a of the first actuating part 251 engages the abutment 252a of the second actuating part 252 (the first position), the first electric switch SW1 is depressed by the arm 251a of the first actuating part 251. From this first position, further movement of the first actuating part 251 along the first path P1 results in the second actuating part 252 pivoting about the first axis A1 to actuate the second electric switch SW2 or both the second and third electric switches SW2 and SW3, depending on the amount of pivotal movement of the first actuating part 251.

The bicycle control device 212 only differs from the bicycle control device 12 in the operating part 250 of the first operating member 230 is pivotally mounted on the second operating member 236 about the second axis A2' and the user operating part 250 and the first actuating part 251 are not connected together as briefly explained above. While the structure of the first operating member 230 to actuate the electric switches SW1, SW2 and SW3 is different from the first embodiment, the general principle operation and actuation of the electric switches SW1, SW2 and SW3 by the first operating member 230 is generally the same as the first embodiment. In view of the similarity between the first and third embodiments, the bicycle control device 212 will not be discussed and/or illustrated in more detail herein.

Referring now to FIGS. 16 to 21, a bicycle control device 312 is illustrated in accordance with a fourth embodiment. The bicycle control device 312 includes a base member 328, a first operating member or lever 330, an electric unit 332, a hydraulic unit 334 and a controller 340. Here, in the fourth illustrated embodiment, only a single member or lever (i.e., first operating member 330) is used for both shifting and braking. The first operating member 330 includes a combined user operating-actuating part 350 and an actuating part 352. The actuating part 352 pivots relative to the base member 328 about the first axis A1 similar to the first embodiment. The combined user operating-actuating part 350 pivots about the fourth axis A4 similar to the first embodiment.

In this fourth embodiment, a support bracket 338 is pivotally attached to the base member 328 to form a third axis A3'. The electric unit 332 is mounted on the support bracket 338 so that the electric unit 332 moves with the first operating member 330 as the first operating member 330 moves along the second path P2. Otherwise, the electric unit 332 is operated by movement of the first operating member 330 along the first path P1 in the same manner as the first operating member 30. Thus, the electric unit 332 includes the electric switches SW1, SW2 and SW3. In view of the similarity between the first and fourth embodiments, the bicycle control device 312 will not be discussed and/or illustrated in more detail herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle control device. Accordingly, these directional terms, as utilized to describe the bicycle control device should be interpreted relative to a bicycle in an upright riding position on a horizontal surface and that is equipped with the bicycle control device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control device comprising:
a base member configured to be fixed to a bicycle part;
a first operating member coupled to the base member, the first operating member being configured to move along a first path from a rest position to a first position as a first movement, and the first operating member being configured to move along the first path from the rest position to a second position via the first position as a second movement;
an electric unit configured to output a first signal causing a first operation of an electric device in response to the first movement, and the electric unit configured to output a second signal causing a second operation of the electric device in response to the second movement, the first operation being one of an upshift operation and a downshift operation and the second operation being the other of the upshift operation and the downshift operation;
a hydraulic unit coupled to the base member to operate a hydraulic device, the hydraulic unit including a cylinder having a cylinder bore disposed in the base member and a piston movably disposed in the cylinder bore; and
a second operating member coupled to the base member, the second operating member being configured to move along a second path differing from the first path so as to actuate the hydraulic unit in response to a movement along the second path, the first operating member is configured to be pivotally moved relative to the base member about a first axis along the first path, and to be pivotally moved relative to the base member about a second axis to move along the second path.

2. The bicycle control device according to claim 1, wherein the second operating member is configured to be pivotally moved relative to the base member about a third axis along the second path, and the first operating member is configured to be moved along the second path in response to a pivotal movement of the second operating member along the second path.

3. The bicycle control device according to claim 1, wherein the piston is coupled to the second operating member and movably arranged at the cylinder so as to form a fluid chamber in the cylinder, the hydraulic unit is configured such that the piston is pushed to reduce a volume of the fluid chamber.

4. The bicycle control device according to claim 3, wherein the second operating member is configured to be pivotally moved relative to the base member about a third axis along the second path, and the cylinder is arranged directly above the third axis in a state where the bicycle control device is fixed to the bicycle part.

5. The bicycle control device according to claim 4, wherein the hydraulic unit further includes a fluid reservoir being in fluid communication with the cylinder, the fluid reservoir is arranged directly above the third axis in a state where the bicycle control device is fixed to the bicycle part.

6. The bicycle control device according to claim 1, wherein the first signal does not cause the first operation when the second signal is output.

7. A bicycle control device comprising:

a base member configured to be fixed to a bicycle part;

a first operating member coupled to the base member, the first operating member being configured to move along a first path from a rest position to a first position as a first movement, and the first operating member being configured to move along the first path from the rest position to a second position via the first position as a second movement;

an electric unit configured to output a first signal causing a first operation of an electric device in response to the first movement, and the electric unit configured to output a second signal causing a second operation of the electric device in response to the second movement, the first operation being one of an upshift operation and a downshift operation and the second operation being the other of the upshift operation and the downshift operation; and a hydraulic unit coupled to the base member to operate a hydraulic device, the hydraulic unit including a cylinder having a cylinder bore disposed in the base member and a piston movably disposed in the cylinder bore, the electric unit includes a first electric switch configured to output the first signal in response to the first movement of the first operating member, and a second electric switch configured to output the second signal in response to the second movement of the first operating member.

8. The bicycle control device according to claim 7, further comprising a controller electrically coupled to the first and second electric switches, the controller outputting a first command to cause the first operation in response to receiving the first signal upon a state in which the second signal is absent within a predetermined period after receiving the first signal, and the controller outputting a second command to cause the second operation in response to receiving the second signal.

9. The bicycle control device according to claim 8, wherein the electric device comprises an electric transmission device, and the first command is an upshift command and the second command is a downshift command.

10. The bicycle control device according to claim 8, wherein the controller is configured not to output the first and second commands as the first operating member moves toward the rest position.

11. The bicycle control device according to claim 8, wherein, the first operating member is configured to move along the first path from the rest position to a third position via the first and second positions as a third movement, the electric unit further includes a third electric switch configured to output a third signal in response to the third movement of the first operating member, and the controller is electrically coupled to the third electric switch, and the controller outputs a third command in response to receiving the third signal.

12. The bicycle control device according to claim 11, wherein the controller is configured not to output the first, second and third commands as the first operating member moves toward the rest position.

13. The bicycle control device according to claim 11, wherein the electric device comprises an electric transmission device, and the first command is an upshift command and the second and third commands are downshift commands.

14. The bicycle control device according to claim 11, wherein the electric device comprises an electric transmission device, the controller is coupled to an additional electric transmission device, and the first command is an upshift command of the electric transmission device, the second command is the downshift command, and the third command is a synchromode control command between the electric transmission device and the additional electric transmission device.

15. A bicycle control device comprising:

a base member configured to be fixed to a bicycle part;

a first operating member coupled to the base member, the first operating member being configured to move along a first path from a rest position to a first position as a first movement, and the first operating member being configured to move along the first path from the rest position to a second position via the first position as a second movement;

an electric unit configured to output a first signal causing a first operation of an electric device in response to the first movement, and the electric unit configured to output a second signal causing a second operation of the electric device in response to the second movement, the first operation being one of an upshift operation and a downshift operation and the second operation being the other of the upshift operation and the downshift operation; and a hydraulic unit coupled to the base member to operate a hydraulic device, the electric unit includes a first electric switch configured to output the first signal in response to the first movement of the first operating member, and a second electric switch configured to output the second signal in response to the second movement of the first operating member, the first electric switch being disposed at the first operating member and the second electric switch being disposed at the base member.

\* \* \* \* \*